(12) United States Patent
Vestergaard et al.

(10) Patent No.: US 9,143,826 B2
(45) Date of Patent: Sep. 22, 2015

(54) SCRIPT-BASED VIDEO RENDERING USING ALPHA-BLENDED IMAGES

(76) Inventors: Steven Erik Vestergaard, Vancouver (CA); Che-Wai Tsui, Coquitlam (CA); Shaoning Tu, Port Coquitlam (CA)

( * ) Notice: Subject to any disclaimer, the term of this patent is extended or adjusted under 35 U.S.C. 154(b) by 356 days.

(21) Appl. No.: 13/484,064

(22) Filed: May 30, 2012

(65) Prior Publication Data
US 2013/0047074 A1 Feb. 21, 2013

Related U.S. Application Data

(63) Continuation of application No. PCT/CA2012/050345, filed on May 25, 2012.

(60) Provisional application No. 61/524,269, filed on Aug. 16, 2011, provisional application No. 61/557,856, filed on Nov. 9, 2011.

(51) Int. Cl.
*H04N 5/265* (2006.01)
*H04N 21/44* (2011.01)
(Continued)

(52) U.S. Cl.
CPC .................. *H04N 21/44* (2013.01); *G06F 3/14* (2013.01); *G06F 9/445* (2013.01); *G11B 27/034* (2013.01); *G11B 27/10* (2013.01); *G11B 27/28* (2013.01); *H04N 5/272* (2013.01);
(Continued)

(58) Field of Classification Search
CPC ... G06F 17/2247; G06F 17/24; G06F 17/211; G11B 27/034; G11B 27/10; H04N 21/44
USPC ......................................................... 715/234
See application file for complete search history.

(56) References Cited

U.S. PATENT DOCUMENTS 5,767,867 A * 6/1998 Hu ................................ 345/561
6,026,195 A * 2/2000 Eifrig et al. ................... 382/236
(Continued)

FOREIGN PATENT DOCUMENTS

EP 1269321 1/2003
WO 0127754 4/2001
(Continued)

OTHER PUBLICATIONS

Doenges, et al. "MPEG-4: Audio/Video & Synthetic Graphics/Audio for Mixed Media", 1997.
(Continued)

*Primary Examiner* — Cesar Paula
*Assistant Examiner* — Luu-Phuong Nguyen
(74) *Attorney, Agent, or Firm* — Todd A. Rattray; Oyen Wiggs Green & Mutala LLP

(57) ABSTRACT

Systems and methods are provided for cross-platform rendering of video content on a user-computing platform that is one type of a plurality of different user-computing platform types. A script is transmitted to the user-computing platform and is interpreted by an application program compiled to operate on any one of the plurality of user-computing platform types. Transmitting the script causes the script to be interpreted by the application program operating on the user-computing platform to cause the interpreted script to directly decode encoded video data transmitted or otherwise accessible to the user-computing platform into decoded video data and to further cause the rendering of the decoded video data.

40 Claims, 12 Drawing Sheets

(51) Int. Cl.
*G06F 3/14* (2006.01)
*H04N 5/272* (2006.01)
*H04N 21/2343* (2011.01)
*H04N 21/43* (2011.01)
*H04N 21/434* (2011.01)
*H04N 21/4402* (2011.01)
*H04N 21/61* (2011.01)
*H04N 21/8543* (2011.01)
*G11B 27/034* (2006.01)
*G11B 27/10* (2006.01)
*G11B 27/28* (2006.01)
*G06F 9/445* (2006.01)

(52) U.S. Cl.
CPC ........... *H04N 21/234309* (2013.01); *H04N 21/234381* (2013.01); *H04N 21/4307* (2013.01); *H04N 21/4341* (2013.01); *H04N 21/44004* (2013.01); *H04N 21/440218* (2013.01); *H04N 21/440281* (2013.01); *H04N 21/6125* (2013.01); *H04N 21/8543* (2013.01)

(56) References Cited

U.S. PATENT DOCUMENTS

| | | | |
|---|---|---|---|
| 6,573,907 | B1 | 6/2003 | Madrane |
| 6,825,780 | B2 | 11/2004 | Saunders et al. |
| 6,983,420 | B1* | 1/2006 | Itou et al. ................... 715/723 |
| 7,055,169 | B2 | 5/2006 | Delpuch et al. |
| 7,555,757 | B2 | 6/2009 | Smith et al. |
| 7,593,576 | B2 | 9/2009 | Meyer et al. |
| 7,761,602 | B1 | 7/2010 | Knight et al. |
| 7,770,116 | B2* | 8/2010 | Zhang et al. ............... 715/716 |
| 7,821,881 | B2 | 10/2010 | Hamada et al. |
| 7,860,266 | B2* | 12/2010 | Sekiguchi et al. ......... 382/100 |
| 7,921,415 | B1 | 4/2011 | Bodell et al. |
| 7,933,456 | B2 | 4/2011 | Han et al. |
| 8,005,339 | B2 | 8/2011 | Hamada et al. |
| 8,139,926 | B2 | 3/2012 | Hamada et al. |
| 8,146,075 | B2 | 3/2012 | Mahajan |
| 8,171,077 | B2 | 5/2012 | Huynh et al. |
| 8,332,905 | B2 | 12/2012 | Jenkin et al. |
| 8,432,403 | B2 | 4/2013 | Kota et al. |
| 8,432,404 | B2 | 4/2013 | Kota et al. |
| 8,487,941 | B2 | 7/2013 | Kota et al. |
| 8,487,942 | B2 | 7/2013 | Kota et al. |
| 8,751,565 | B1* | 6/2014 | Jia .............................. 709/203 |
| 2002/0105529 | A1* | 8/2002 | Bowser et al. ............. 345/629 |
| 2003/0033449 | A1 | 2/2003 | Frantz et al. |
| 2004/0062314 | A1 | 4/2004 | Demas et al. |
| 2004/0181611 | A1 | 9/2004 | Ratnakar |
| 2005/0063586 | A1* | 3/2005 | Munsil et al. .............. 382/162 |
| 2005/0122341 | A1* | 6/2005 | MacInnis et al. .......... 345/558 |
| 2005/0228865 | A1 | 10/2005 | Hirsch |
| 2006/0182424 | A1 | 8/2006 | Lamkin et al. |
| 2006/0209907 | A1 | 9/2006 | Yoo |
| 2007/0124270 | A1 | 5/2007 | Page |
| 2007/0192818 | A1 | 8/2007 | Bourges-Sevenier et al. |
| 2007/0282951 | A1 | 12/2007 | Selimis et al. |
| 2008/0201736 | A1 | 8/2008 | Gordon et al. |
| 2009/0103897 | A1* | 4/2009 | Chen et al. .................... 386/104 |
| 2009/0153720 | A1* | 6/2009 | Suzuki et al. ............ 348/333.01 |
| 2009/0300406 | A1 | 12/2009 | Katou |
| 2009/0300685 | A1 | 12/2009 | Easter |
| 2010/0020352 | A1 | 1/2010 | Morimoto |
| 2010/0043038 | A1* | 2/2010 | Li ................................. 725/103 |
| 2010/0066866 | A1 | 3/2010 | Lim |
| 2010/0272188 | A1 | 10/2010 | Park et al. |
| 2011/0033169 | A1 | 2/2011 | Ando et al. |
| 2012/0092450 | A1* | 4/2012 | Choi et al. ..................... 348/43 |
| 2012/0317236 | A1* | 12/2012 | Abdo et al. ................... 709/219 |
| 2013/0013671 | A1 | 1/2013 | Relan et al. |

FOREIGN PATENT DOCUMENTS

| | | |
|---|---|---|
| WO | 0193043 | 12/2001 |
| WO | 02/089486 | 11/2002 |
| WO | 2010108053 | 9/2010 |

OTHER PUBLICATIONS

Chen, Tsuhan, "The Past, Present, and Future of Image and Multidimensional Signal Processing", IEEE Signal Processing Magazine, Mar. 1998.

Search Report dated Mar. 25, 2015 issued by the European Patent Office (EPO) for European Application No. 12824114.8 filed May 25, 2012, 6 pages.

International Search Report (ISR) dated Aug. 9, 2012 issued by the International Searching Authority for Patent Cooperation Treaty Application No. PCT/CA2012/050345 filed May 25, 2012, 7 pages.

Written Opinion of the International Searching Authority dated Aug. 9, 2012 for Patent Cooperation Treaty Application No. PCT/CA2012/050345 filed May 25, 2012, 3 pages.

USPTO Office Action issued on U.S. Appl. No. 13/528,556 dated Nov. 17, 2014, 51 pages.

USPTO Office Action issued on U.S. Appl. No. 13/517,571 dated Oct. 23, 2014, 40 pages.

USPTO Office Action issued on U.S. Appl. No. 13/517,574 dated Nov. 12, 2014, 52 pages.

USPTO Office Action issued on U.S. Appl. No. 13/517,574 dated Mar. 23, 2015, 35 pages.

USPTO Office Action issued on U.S. Appl. No. 13/517,568 dated Nov. 5, 2014, 44 pages.

USPTO Office Action issued on U.S. Appl. No. 13/529,187 dated Nov. 14, 2014, 61 pages USPTO Office Action issued on U.S. Appl. No. 13/529,187 dated May 15, 2015, 45 pages.

USPTO Office Action issued on U.S. Appl. No. 13/529,253 dated Oct. 23, 2014, 54 pages.

USPTO Office Action issued on U.S. Appl. No. 13/529,253 dated Mar. 20, 2015, 39 pages.

Examination Report issued by the New Zealand Intellectual Property Office dated Jul. 23, 2014 for New Zealand Application No. 622065, 2 pages.

* cited by examiner

SCRIPT-BASED VIDEO RENDERING USING ALPHA-BLENDED IMAGES

RELATED APPLICATIONS

This application is a continuation of Patent Cooperation Treaty application No. PCT/CA2012/050345 filed 25 May 2012 which in turn claims priority from U.S. application No. 61/557,856 filed 9 Nov. 2011 and from U.S. application No. 61/524,269 filed 16 Aug. 2011. All of the related applications of this paragraph are hereby incorporated herein by reference.

TECHNICAL FIELD

The invention relates to methods and systems for cross-platform rendering of video content on user-computing devices using an interpreted script. Particular embodiments provide methods and systems for cross-platform rendering of video content using a script embedded in an HTML document which, when interpreted by the script interpreter of an internet browser, cause the interpreted script to directly decode video data into frame images and causes the internet browser to natively render the frame images. Particular embodiments provide methods and systems for encoding video content.

BACKGROUND

Digital video is frequently described using a number of terms, such as video content, video media, audiovisual media, audiovisual content, multimedia, rich media and/or the like. In this description, video content should be understood to include any such content and/or media which may be embodied by, or which may otherwise comprise, video data, audio data or video data in combination with audio data. In some cases, video data and/or audio data may be grouped with other data, such as image data, metadata and/or the like. Unless otherwise indicated by the context, video content should be understood to potentially comprise such image data, metadata and/or the like. By way of non-limiting example, video content may be streamed or otherwise transmitted over the internet or some other type of data network (for example, via a host server or a peer device), cached (for example, cached by an ISP, a proxy server or some other intermediary), locally cached (for example, cached by a internet browser running on the user-computing device) or locally stored or otherwise locally accessible to a user computing device.

Currently, digital video content available on the internet (or otherwise) is encoded, transmitted and rendered using a wide variety of techniques and schemes. There are a number of drawbacks associated with the currently available video rendering technologies.

One drawback with using typical prior art digital video technologies to distribute and perform video content on a user-computing device is that a dedicated application program (typically referred to as a media player) must be downloaded and installed onto the user-computing device or must be pre-installed by the provider of the user-computing device platform (a user-computing device platform comprises the user-computing device hardware and operating system software). In this description, an application program refers to a compiled program (executable object code modules and/or other compiled code segments) capable of independently performing applications, functions or operations on its own and without the assistance of another application program. An application program contrasts with an add-on, described further below, because an add-on depends on a host application to provide its functionality, whereas an application program is capable of performing its functionalities independently. Also, not all independent programs are application programs. For example, virtual machines, such as the Java Virtual Machine, are not application programs, because such virtual machines merely provide virtual environments (such as virtual operating systems and virtual hardware) and do not perform an independent application, function or operation. Such virtual machines require application programs (such as compiled Java bytecode application programs) to perform any applications, functions or operations. Some users may be incapable of downloading or installing a separate media player. Some users may be reluctant to download a separate media player, given the security and/or privacy threats (for example, viruses, malware, local share object and/or the like) associated with downloading files generally, and executable application programs in particular.

In addition, a media player application program is typically downloaded and installed as a compiled object code module and therefore a different compilation target is required for each version of user-computing device platform that may exist in the market. Given the growth and variety of mobile smartphone platforms as well as the wide variety of personal computer platforms, the number of target platforms that have to be supported is burdensome because one compiled version of a media player will likely not operate on a hardware and/or operating system platform for which it was not targeted. The complexity is increased when the compatibility of a media player with a platform may be compromised by other installed application programs which may conflict with the media player.

Some user-computing device hardware and/or software platforms do not support some media player applications (or vice versa) and media player applications are unavailable for such hardware and software platforms. Further, a user who may want to download and install a media player will typically require some knowledge of their user-computing device hardware and/or software platform to download the correct player. In addition to the issues associated with downloading and installing the media player, rendering video content requires execution of a media player application, which typically consumes significant computing resources (for example, RAM, CPU time and the like), even where the particular player is already downloaded and installed.

Some video content rendering technologies use "hidden players" which refers to cases where a host application program (such as an internet browser or the like) operating on the user-computing device automatically downloads and installs a media player add-on. In this description, the term add-on should be understood to include add-ons, plug-ins, snap-ins, extensions, applets and/or the like. Add-ons are compiled programs (that is, executable object code modules, other compiled code segments and the like) which add specific functionalities (for example, video content rendering) to a "host" application program. While add-ons may perform some functionalities, they depend on their host application program for their operability. Examples of add-ons that may be used in connection with a host internet browser application program include: media player add-ons, PDF reader add-ons, Java Virtual Machine (JVM) add-ons and the like.

In some cases, a media player add-on (or instructions which cause the user-computing device to download and install a media player add-on) may be bundled with the video content file. In other cases, video distribution techniques cause the user-computing device's internet browser to separately download the media player add-on and the video content file. Since such media player add-ons must actually be downloaded and installed prior to execution, such media player add-ons suffer from similar drawbacks to those of their overt media player counterparts. Some application programs (for example, internet browsers, anti-virus programs and/or the like) or operating system software may have security and/or privacy settings (set by their users, their network administrators or the like) which block the automatic download of such media player add-ons. After download and installation of a media player add-on, execution of the media player add-on consumes significant processing resources. Being a compiled module, a different version of add-on must be created and tested for each possible destination a platform that it could be run on.

There is a general desire to render video content in a manner which avoids downloading and installing, pre-installing or compiling a separate media player or media player add-on on the user-computing device. There is a general desire to distribute and perform video content in a manner which is platform independent or that has relatively high degree of cross-platform operability.

Another drawback with the use of current technologies to distribute and perform content on a user-computing device occurs in the context of streaming video content, where current technologies typically use a streaming content server which performs some "handshaking" protocol with the user-computing device each time that the user-computing device requests a video content stream. A disadvantage associated with the use of a content server and the associated handshaking protocol is that they can preclude local (or downstream) caching of the video content. Such local or downstream caching can save bandwidth (and associated costs) and improve reliability of the stream (thereby increasing the video quality).

Another disadvantage with the use of current technologies to distribute and perform video content on a user-computing device occurs when it is desirable to update one or more CODECs. A CODEC is a scheme for encoding audio or video data to reduce the bandwidth necessary for its transmission and then decoding the data at the other side of the transmission. Typically, using a CODEC involves compressing the data on the transmitting side and decompressing the data on the receiving side. Decoding can also involve parsing and unpacking data as it arrives at the receiving computer device and/or reorganizing the data into a format that can be used by the receiving computer device. Prior art video rendering technologies typically involve the use of a compiled computer program module which, when executed, performs the decoding process. If video content is encoded with an updated CODEC at the transmission side, then typically the video content will not be capable of being decoded at the user-computing device unless the new updated decoding program for that CODEC is downloaded and installed at the user-computing device.

Various newer internet browser application programs are able to natively render videos embedded in webpages using the HTML5 <video> tag. Unfortunately, CODEC support is not, at present, uniform across all browsers. In the ongoing development of the HTML 5 standard, there continues to be debate over what video formats, if any, should be natively renderable by HTML 5 compliant browsers. Though multiple copies of video content may be provided for use with different CODECs, this typically requires transcoding video content from one CODEC to another. Though it is possible to transcode video content so that it is encoded according to different CODECs, this has drawbacks. For example:

transcoding takes time and effort;
transcoding is typically a computationally intensive process, so that providing real-time transcoding is, at present, technically difficult and/or relatively computationally expensive;
where video content is transcoded to be encoded according to different CODECs in advance, multiples copies of the video content (one for each different CODEC) must typically be stored, which may be onerous for large quantities of video content;
some CODECs are proprietary, and their lawful use is either restricted or requires payment of licensing fees; and
serving video content encoded according to different CODECs may require use of different streaming servers.

There is accordingly a general desire for methods and systems for rendering video content which overcome or ameliorate some of these or other drawbacks with existing video content rendering technology.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

In drawings which illustrate non-limiting embodiments of the invention.

DESCRIPTION

Figure 1:
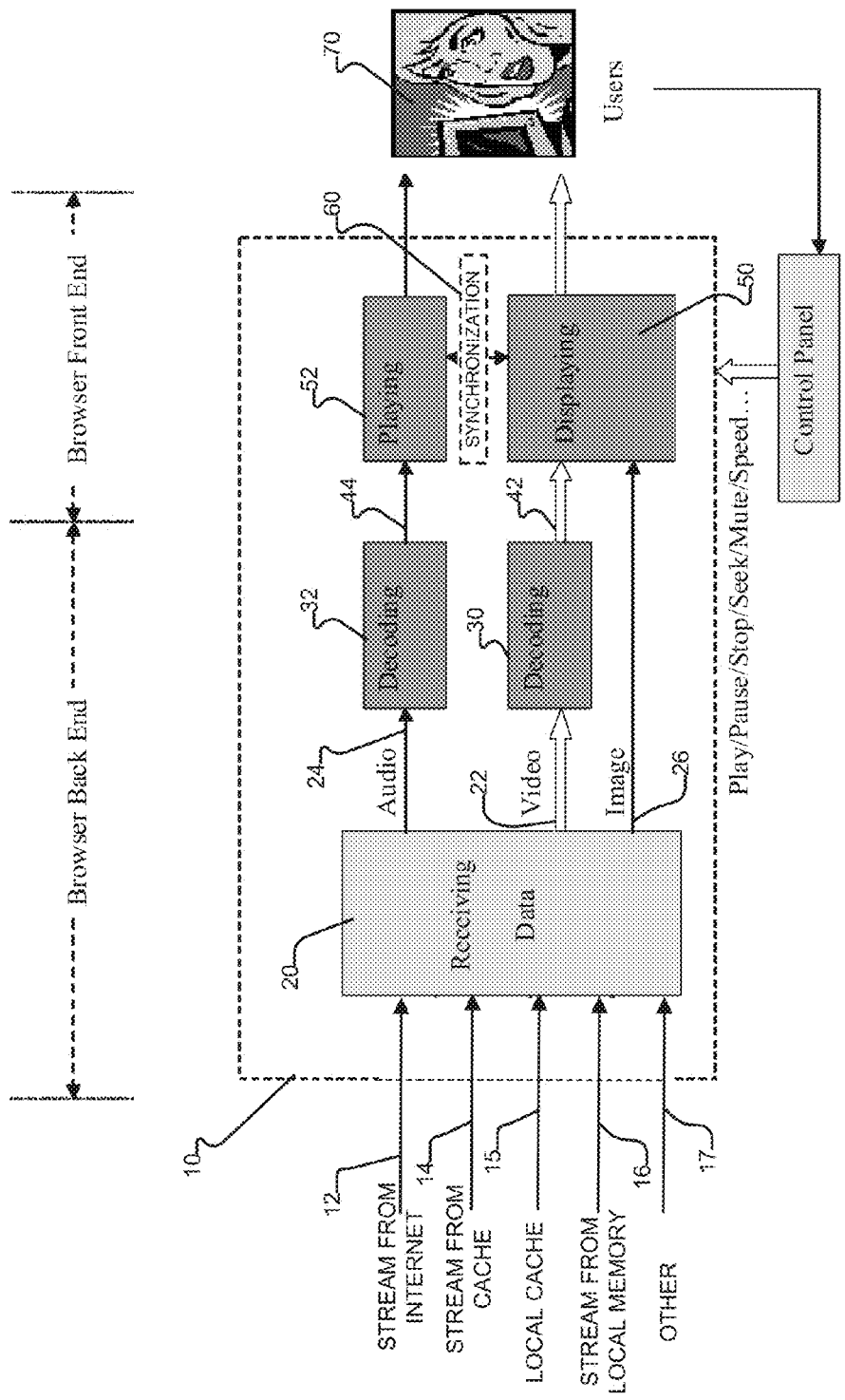
FIG. 1 is a schematic block diagram showing functional components of a script according to a particular embodiment which may be embedded in an HTML document and which may be interpreted by an application program such as an internet browser to render video content.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

In this disclosure and patent claims, the following technical terms have the corresponding definitions set forth below.

Application program means a compiled program (executable object code modules, other compiled code segments and/or the like) capable of independently performing applications, functions or operations on its own and without the assistance of another application program.
  Add-on means a compiled programs (that is, executable object code modules, other compiled code segments and/or the like) which add specific functionalities (for example, video content rendering) to a "host" application program.
  Script means a non-compiled series of cross-platform instructions which are typically, but not necessarily, human-readable and which are interpreted by a script interpreter of an application program without being compiled.
  When a script is interpreted by an application program to perform a functionality "directly", it means that a script containing the expression of the functionality is interpreted to perform the functionality itself, without relying on pre-compiled modules provided by the application program (or some other application program or add-on) to perform the functionality.
  When an application program (such as an internet browser) performs a functionality "natively", it means that the application program performs the functionality by itself (with the possible assistance of the computing device hardware and/or operating system), but without having to rely on an add-on. An application program may natively perform a functionality by calling on its own pre-compiled code modules, but not the pre-compiled code modules of an add-on. An application program can natively perform a functionality under the direction of a script.

Particular embodiments of the invention provide methods and systems for rendering video content on a user-computing device using a cross-platform script which is interpreted by an application program (such as an internet browser) to natively render the video and/or audio data that embodies the video content. Particular functionalities of the video rendering process may be performed directly by the script as the script is interpreted. In this description, the term script means a non-compiled series of cross-platform instructions which are typically, but not necessarily, human-readable and which are interpreted by a script interpreter of an application program without being compiled. Typical application programs and add-ons are compiled prior to execution into machine code. A script contrasts with conventional compiled code application programs and add-ons because the script is not compiled. A script is also distinct from Java bytecode. Bytecode is partially pre-compiled prior to being interpreted and is compiled into machine code as it is interpreted. In contrast, a script is not compiled into machine code as it is interpreted. In this description, when a script is interpreted, it is meant that a script interpreter of an application program reads the scripted instructions and performs the scripted instructions without compiling the scripted instructions into machine code.

By way of non-limiting example, in some embodiments, a script may be embedded in a Hypertext Markup Language (HTML) document and may be interpreted by an internet browser application program running on a user-computing device when the internet browser application program renders the HTML document to thereby display the HTML page. The internet browser operating on the user-computing device may receive the HTML document from a location on the internet specified by a Universal Resource Locator (URL) input into the browser. Most internet browser application programs include one or more native script interpreters which natively interpret scripts. By way of non-limiting example, the script may be written in a cross-platform scripting syntax, such as ECMAScript, JavaScript, Jscript, ActionScript, a scripting syntax inherent in an HTML standard (for example, HTML 5) and/or the like. In this description, when an application program (such as an internet browser) performs a functionality or operation natively, it is meant that the application program itself performs the functionality (with the possible assistance of the computing device hardware and/or operating system), but without having to rely on an add-on. An application program may natively perform a functionality by calling on its own pre-compiled code modules, but not the pre-compiled code modules of an add-on.

Particular aspects of the invention provide scripts which can be interpreted by application programs (such as internet browsers) to cause the browser to natively render video data on a user-computing device. In some embodiments, the user-computing device may use a different application program (for example, other than an internet browser) which may include a native script interpreter or which is otherwise capable of interpreting scripts. In such embodiments, scripts may be interpreted by such other application programs and, when so interpreted, may cause such other application programs to natively render video data on the user-computing device. For the sake of brevity and without loss of generality, the remainder of this application may refer to scripts being interpreted by internet browsers to cause the internet browsers to natively render video data. References to internet browsers should be understood to include other application programs that are not internet browsers but which may include one or more script interpreters or which may otherwise be capable of natively interpreting scripts. By way of non-limiting example, such scripts may, but need not necessarily be, provided in documents communicated using the hypertext transport protocol (HTTP)).

In some embodiments, an application program may interpret a script and thereby cause the interpreted script to directly perform one or more functionalities (associated with video and/or audio rendering). In this description, when a script is interpreted by an application program to perform a functionality directly, it means that the script is interpreted to perform the functionality itself. When a script is interpreted by an application program to perform a functionality directly, the interpreted script contains the expression of the functionality and does not rely on pre-compiled modules provided by the application program (or some other application program or add-on) to perform the functionality. For example, in some embodiments, an internet browser may interpret a script to cause the interpreted script to directly: perform a decoding functionality which decodes video content from its encoded format into frame images; re-format frame images into a format that can be natively rendered by the internet browser; and/or control or synchronize the timing of video and audio rendering.

Particular embodiments involve using a script embedded in a HMTL document which is interpreted by an internet browser to cause the interpreted script to directly decode video data into a series of individual frame images and to natively display the series of frame images as a series of bitmaps on a display of the user-computing device. Some embodiments similarly involve additionally using a script which is interpreted by an internet browser to cause the interpreted script to directly decode audio data and to natively playback the decoded audio data on the user-computing device. Where video content comprises both video data and audio data, the script may be interpreted by the internet browser to synchronize the display of frame images with the playback of decoded audio data, thereby rendering audio-visual video content (for example, movies) in a manner that the user expects to experience.

Particular embodiments provide methods and systems for encoding video content which are suitable for use with the aforementioned script-based video rendering techniques.

Computers and similar user-computing devices generally understand machine or object code which may vary as between microprocessor types. Software engineers usually program in a so called "high level" language, like C, then use a compiler which will convert the high level code (typically referred to as source code) machine or object code ahead of time. A drawback with programming in a high level language and then compiling the human-readable source code into a compiled and executable version is that the compiled version of the program is not portable or "cross-platform". The compiled code is created specifically for a target user-computing platform (hardware and operating system of the user-computing device). This can be problematic in some circumstances as described above.

To address this issue, cross-platform computer languages have been proposed—for example, Java. This computer language is partially pre-compiled into so-called bytecode prior to being received at the user-computing device and expects that the user computing device can call an additional pre-compiled program (known as a Java virtual machine (JVM)) which will understand the bytecode. Being compiled code, the JVM which interprets the bytecode at the user-computing device is particular to the user-computing platform. The JVM might not be available to particular user-computing device platforms or may have limited functionality for particular platforms. Accordingly, the use of Java (and similar computer languages which rely on virtual machines) only shifts the cross-platform operability problem from individual programs to the JVM. That is, instead of pre-compiled programs needing to target a variety of specific user-computing platforms, the JVM needs to target specific a variety of user computing platforms.

Unlike compiled languages and partially compiled languages like Java, scripts are not compiled. Scripts comprise a series of instructions (for example, script tags) written in accordance with a various scripting syntaxes (for example, ECMAScript, JavaScript, Jscript, ActionScript, scripting syntax(es) inherent in an HTML standard and/or the like). Scripted instructions are not compiled, but rather they are interpreted (without being compiled) by application programs operating on the user-computing device to cause the application programs to perform certain actions. A difficulty with using scripts, particularly for processor-intensive tasks, is that the interpretation of scripts is relatively slow (for example, when compared to compiled programs), because the interpretation occurs at run time. Consequently, to the inventors' knowledge scripts comprising a series of script tags have not heretofore been used to cause an internet browser operating on a user-computing device to natively render video content. As discussed above, prior art video rendering technologies rely on precompiled media players, add-ons, JVM and/or the like which have been compiled for specific hardware and software platforms.

FIG. 1 is a block diagram schematic showing functional components of a script 10 for rendering video content on a user-computing device (not expressly shown in FIG. 1) according to a particular embodiment. Script 10 may comprise a series of scripting tags written in a cross-platform script syntax, such as, by way of non-limiting example, ECMAScript, JavaScript, Jscript, ActionScript or the like. The scripting syntax in which rendering engine script 10 is written is preferably widely supported by major operating systems, internet browsers and/or other application programs, so that script 10 may be platform independent and thereby operate on a wide variety of user-computing devices (by way of non-limiting example, desktops, laptops, tablets, smartphones, personal computing devices, application specific devices and/or the like). As discussed above, user-computing devices may have a wide variety of platforms and script 10 may be capable of being interpreted on a wide variety of user-computing devices having a wide variety of platforms. Script 10 may be embedded in a HTML document such that when script 10 is interpreted by an internet browser operating on a user-computing device, script 10 causes the internet browser to natively provide the functional components shown in FIG. 1. In some embodiments, an internet browser operating on a user-computing device may natively interpret script 10 which may in turn cause the internet browser to natively render video data without requiring that the user-computing device download, install or execute any additional pre-compiled decoder for a CODEC, media player add-on or other media player application to run alongside or in conjunction with the internet browser.

In one particular embodiment, an HTML document comprises script 10 and a reference to a video content file. Script 10 may be interpreted by an internet browser operating on a user-computing device to cause the internet browser to render the video content. The video content rendered as a result of the interpretation script 10 may be: streamed 12 (or otherwise transmitted) over a network communication link (for example, from the internet or from some other network with which the user-computing device is capable of communicating via a host server or a peer device); accessed from a downstream network cache 14 via a suitable network communication link (for example, cached by an ISP, a proxy server or some other intermediary); locally cached 15 (for example, cached in a local cache by an internet browser operating on a user-computing device or otherwise cached in a local cache accessible to the user-computing device); contained in a local file 16 (for example, a file stored in local memory accessible to the user-computing device); and/or the like.

When interpreted, script 10 may cause the internet browser to natively provide a data-receiving element 20 which receives the video content (streamed or otherwise downloaded 12, accessed from one or more downstream caches 14, locally cached 15, locally stored 16 and/or the like 17), accesses the encoded video content and de-multiplexes (or otherwise separates) the different types of data (for example, video data 22 and optionally audio data 24, image data 26 and metadata (not shown)) which may originally be contained in a single data source.

Typically, video data 22 accessed by data receiving block 20 will be encoded using some CODEC scheme. Accordingly, when interpreted by the browser, script 10 of the illustrated embodiment causes the internet browser to provide a decoding element 30 which natively operates to decode video data 22 and to thereby obtain decoded (and typically decompressed) video data 42. In some embodiments, the block 30 decoding functionality may be performed directly by the script. The particular decoding and decompression scheme implemented by decoding element 30 will of course depend on the encoding scheme, or CODEC, used to encode and compress video data 22. Accordingly, the specification of the encoding scheme and corresponding decoding scheme may be known to the developers of script 10. These encoding and decoding schemes (and in particular the decoding scheme implemented by decoding element 30) may comprise open source or otherwise publicly available standards, although this is not necessary.

Similarly to video data 22, audio data 24 accessed by data-receiving block 20 will typically be encoded using some CODEC. Accordingly, when executed, script 10 of the illustrated embodiment causes the internet browser to provide a decoding element 32 which natively operates to decode audio data 24 and to thereby obtain decoded (and typically decompressed) audio data 44. In some embodiments, the block 32 decoding functionality may be performed directly by the script. The particular decoding and decompression scheme implemented by decoding element 32 will of course depend on the CODEC used to encode and compress audio data 24. Accordingly, the specification of the encoding scheme and corresponding decoding scheme may be known to the developers of script 10. These encoding and decoding schemes (and in particular the decoding scheme implemented by decoding element 32) may comprise open source or otherwise publicly available standards, although this is not necessary. In a manner similar to that of video data 22 discussed above, compressed audio data encoded in a proprietary format may be decoded into a publicly available format to provide audio data 24, so that decoding element 32 may be implemented through the execution of a publicly visible script 10.

When interpreted, script 10 also causes the internet browser to provide a video display element 50 which natively displays frame images from the decoded video data stream 42 on a display 70 of the user-computing device. Once encoded video data 22 is decoded in decoding block 30 to provide a decoded video stream 42 (comprising a series of frame images, for example), decoded video stream 42 is displayed on the display of the user-computing device by display element 50. In some embodiments, display element 50 involves using the so called canvas element or canvas tag. The canvas tag is a HTML5 tag which allows for dynamic, scriptable rendering of 2D shapes and bitmap images (of a specified pixel height and width) on the display of a user-computing device (for example, display 70). The canvas tag may be used to display bitmap images at a frame rate that is sufficiently fast that it is perceived by humans to be video.

In some embodiments, display element 50 involves using the canvas tag to display a subset of the frame images of decoded video data stream 42. For example, bitmap frames of decoded video stream 42 may be dropped in circumstances where an optional synchronization block 60 (explained in more detail below) indicates that display block 50 is displaying bitmap images at a rate that is falling behind the playback of audio data 44 and/or in other circumstances where available processing resources might make it desirable to display a subset of the frame images of decoded video stream 42. In some embodiments, frame images may be caused to persist on the display of the user-computing device—for example, when synchronization functionality 60 indicates that display element 50 is displaying images at a rate that is leading the playback of audio data 44. Where display element 50 involves using the canvas tag to display a subset of the frame images of decoded video stream 42, display element 50 and/or synchronization block 60 may involve selecting particular frame images from within decoded video stream 42 for display.

In some embodiments, the execution of script 10 causes the internet browser to provide display block 50 whose functionalities (for example, displaying frame images (for example, bitmap frame images) from within decoded video stream 42 and optionally selecting frame images from within decoded video stream 42 for display) are implemented natively by the internet browser without calling or otherwise executing any additional pre-compiled application program or add-on.

Because of the continually increasing processing power of digital devices, display element 50 provided by the execution of script 10 is able to display bitmap images at frame rates that approach those of conventional video playback using customized video playback applications. In some embodiments, display element 50 is capable of displaying 640×480 pixel bitmap images at frame rates greater than 40 frames/second. In some embodiments, display element 50 is capable of displaying 640×480 pixel bitmap images at frame rates greater than 50 frames/second.

In the illustrated embodiment, the video content comprises optional image data 26. Display element 50 may also cause image data 26 to be natively displayed on user-computing device 70. Most internet browsers include a native functionality for displaying JPEG image data which may be called by the browser under instruction from the portion of script 10 associated with the provision of display element 50.

When implemented, script 10 also provides an audio playback element 52 for natively playing back decoded audio stream 44. In some embodiments, decoded audio stream 44 comprises a .WAV format audio stream. Most internet browsers include a native functionality for playback of .WAV format audio streams which may be called by the browser under instruction from the portion of script 10 associated with audio playback element 52. This native audio playback functionality may also comprise or have access to time reference information associated with the playback of decoded audio stream 44. This playback time reference information may be fed back to synchronization block 60 described below.

Script 10, when implemented, may optionally cause the internet browser to provide a synchronization block 60 which maintains synchronization within acceptable tolerance between the playback of decoded audio data 44 by audio playback element 52 and the display of frame images from decoded video data 42 by display element 50. In some embodiments, synchronization block 60 makes use of a reference timing point (for example, the start of playback of audio data 44) and time stamp information (referred to as an audio playback time reference) obtained from audio playback block 52. In some embodiments, synchronization block 60 may cause display element 50 to check the audio playback time reference from audio playback block 52 prior to selecting a frame image for display. Synchronization block 60 may then cause display element 50 to select an frame image which corresponds to the audio playback reference time and to display the selected frame image as a bit map using the canvas tag. If the audio playback reference time from audio playback element 52 indicates that the playback of decoded audio data 44 is leading the display of frame images from within decompressed video data 42, then synchronization block 60 may cause display element 50 to skip over one or more frame images. If the audio playback reference time from audio playback element 52 indicates that the playback of decoded audio data 44 is trailing the display of frame images from within decompressed video data 42, then synchronization block 60 may cause display element 50 to cause a delay in the update of frame images (for example, to cause some frame images to persist). In this manner, the video data displayed by display element 50 may be synchronized with the audio playback of audio playback element 52.

A control panel 80 functionality may be provided to a user (not shown)—through a graphical user interface, for example. Control panel 80 may provide a user with the ability to control the playback of video data 42 and/or audio data 44 by script 10. By way of non-limiting example, control panel 80 may provide the user with the control to play back the data, to pause the playback of the data, to seek a location in time within the data, to adjust the volume of the playback, to adjust the speed of the playback or the like. In the illustrated embodiment, control panel 80 is provided outside of script 10, but this is not necessary. In some embodiments, script 10 may cause the internet browser to provide control panel 80.

Figure 2A:
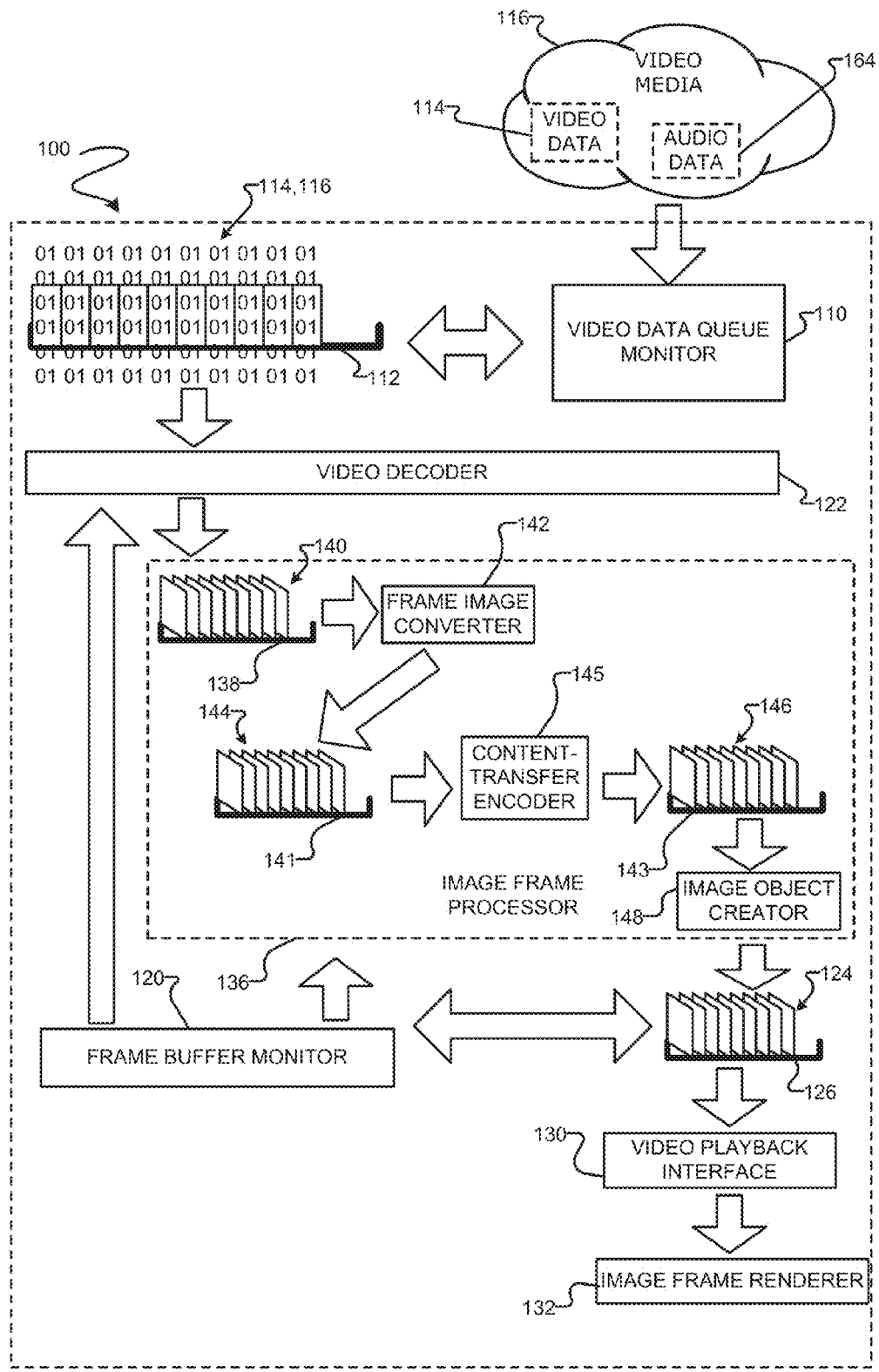
FIG. 2A is a schematic block diagram of a video rendering system according to an example embodiment.

FIG. 2A is a schematic block diagram of a video rendering system 100 according to an example embodiment. In some embodiments, video rendering system 100 is implemented, at least in part, using a cross-platform script interpreted by a script interpreter embodied by an internet browser (or other application program) operating on a user-computing device. In some embodiments, parts of video rendering system 100 are implemented natively by the internet browser interpreting a script. In some embodiments, the script directly performs or implements some of the functionalities of video rendering system 100.

In the illustrated embodiment, video rendering system 100 procures video content 116. In some embodiments, video content 116 resides on a network-accessible host server, a network-accessible cache or a network accessible peer device. In other embodiments, video content 116 may be locally available to the user-computing device. In the remainder of this description, it is assumed (without loss of generality) that video content 116 resides on a host server. In particular embodiments, video rendering system 100 retrieves video content 116 by transmitting to the server an HTTP request containing a URL identifying particular video content 116 hosted at the server (for example, by initiating a "download" or "stream" of video content 116 from the server). As discussed above, video content 116 may comprise video data 114 as well as other data, such as audio data 164, image data (not shown), metadata (not shown) and/or the like. In the illustrated embodiment, video content 116 provided to video rendering system 100 may generally include any such data and is de-multiplexed by video rendering system 100 to access video data 114 contained therein. In other embodiments, video content 116 may be de-multiplexed prior to being received at video rendering system 100 by a suitable de-multiplexer (not shown) to separate video data 114 from video content 116 and to provide video rendering system 100 direct access to de-multiplexed video data 114. Such a de-multiplexer may also be implemented, at least in part, using a cross-platform script interpreted by an internet browser operating on the user-computing device.

In the illustrated embodiment, video rendering system 100 comprises a video data queue monitor 110 configured to cause video data 114 from video content 116 to be stored in a data structure embodying a video data queue 112 and to monitor video data queue 112. In some embodiments, video queue monitor 110 is implemented in an internet browser operating on the user-computing device. In some embodiments, storing video data 114 in video data queue 112 comprises de-multiplexing video data 114 from audio data 164 and other data (for example, images, metadata and/or the like) which may form part of video content 116. This de-multiplexing functionality may be implemented by video data queue monitor 110. In other embodiments, video data queue monitor 110 need not perform this de-multiplexing functionality. As discussed above, in some embodiments, video data 114 may be de-multiplexed by another de-multiplexer (not shown) prior to being received by video rendering system 100. In still other embodiments, data stored in video data queue 112 comprises video content 116 (which is not yet de-multiplexed) and video data 114 may be de-multiplexed from audio data 164 and/or other data while being decoded by decoder 122.

System 100 comprises a video decoder 122. Video decoder 122 decodes video data 114 to provide frame images. In particular embodiments, video decoder 122 is directly implemented by a script when the script is interpreted by an internet browser. System 100 comprises a frame buffer monitor 120. In the illustrated embodiment, frame buffer monitor 120 is configured to cause a decoder 122 decode video data 114 contained in video data queue 112 into frame images and to cause frame image processor 136 to process those frame images to thereby produce frame images 124, which are stored in a data structure embodying a frame image buffer 126 and which are in a format suitable for display by frame image renderer 132. Frame buffer monitor 120 may be implemented natively by an internet browser. In some embodiments, the functionality of frame buffer monitor 120 is implemented directly by the script when the script is interpreted by an internet browser. Frame images 124 comprise a sequence of images which when rendered sequentially (for example, at a suitable frame rate which may be the frame rate of video data 114) are perceived by humans to be video. Frame buffer monitor 120 may be configured to cause decoder 122 and frame image processor 136 to continually decode and process frame images 124 from video data 114 until there are at least a threshold number of frame images 124 in frame image buffer 126 (for example, until frame image buffer 126 is full).

In the illustrated embodiment, optional frame image processor 136 receives frame images 140 (for example, frame images 140 decoded from video data 114) by video decoder 122 and processes such frame images 140 to generate frame images 124 in a format suitable for use by frame image renderer 132. In particular embodiments, some of the functionalities of frame image processor 136 are implemented directly by the script when the script is interpreted by an internet browser. Frame images 140 output from decoder 122 may comprise image files of any suitable graphic file format, including by way of non-limiting example: JPEG, GIF, PNG, TIFF, RAW, BMP and/or the like. Some internet browsers are capable of natively displaying a limited subset of possible image file formats. For example, most every internet browser is capable of natively displaying JPEG and GIF image file formats, but many internet browsers are incapable of natively displaying images having the TIFF file format. In such cases, frame image processor 136 may comprise frame image converter 142 which converts frame images 140 into browser-renderable frame images 144 having one or more image file formats (for example, GIF and/or JPEG) natively displayable by the internet browser. The functionality of frame image converter 142 may be implemented directly by the script when the script is interpreted by the internet browser. It will be appreciated that in circumstances where frame images 140 are already in a file format that can be natively displayed by an internet browser operating on the user-computing device, then frame image converter 142 is not required or may be bypassed.

Frame images 144 are typically represented in so-called binary data formats. Some internet browsers are incapable of accepting images in binary data formats when such images are transferred or otherwise passed from a script interpreter. In such circumstances, frame images 144 may be further processed by frame image processor 136 into a format suitable for being passed from the script interpreter to the internet browser. In the illustrated embodiment, this processing functionality is performed by content-transfer encoder 145 which processes frame images 144 to generate content-transfer encoded frame images 146. The functionality of content-transfer encoder 145 may be implemented directly by the script when the script is interpreted by the internet browser. In one particular embodiment, content-transfer encoder 145 comprises a base64 encoder which processes frame images 144 to generate base64 encoded frame images 146. This is not necessary. In other embodiments, other content-transfer encoding techniques may be used in the place of base64 encoding and frame images 146 may be encoded in accordance with some other suitable content-transfer encoding format.

Frame image processor 136 may then use content-transfer encoded frame images 146 to create image objects using image object creator 148. In some embodiments, image object creator 148 involves causing the script interpreter to invoke a canvas element or the like which is natively implemented by the internet browser to use content-transfer encoded frame images 146 to create frame images 124 in the form of CanvasPixelArray image objects, each containing an array of RGB pixel values. In other embodiments, image object creator 148 can use content-transfer encoded frame images 146 to create frame images 124 in other image object formats. In some embodiments, content-transfer encoded frame images 146 may be passed to the browser by image object creator 148 (or otherwise) using script instructions having a form of:
image.src="data:image/jpg;base64,"+jpeg_encoded_in_content-transfer_format;
As discussed above, frame images 124 may be in a format suitable for display by frame image renderer 132 and may be stored in a data structure embodying frame image buffer 126.

In the illustrated embodiment, decoded frame images 140, browser-renderable frame images 144 and content-transfer encoded frame images 146 are shown as being respectively stored in decoded frame image buffer 138, browser-renderable frame image buffer 141 and content-transfer encoded frame image buffer 143. Such buffers 138, 141, 143 can be useful in some embodiments, particularly (but without limitation) when the functionalities of any of video decoder 122, frame image converter 142, content-transfer encoder 145 and/or image object creator 148 are performed independently of one another in discrete iterations (explained in more detail below). In other embodiments, such buffers 138, 141, 143 are not necessary—i.e. in each iteration, video decoder 122 may create a single decoded frame image 140, which frame image converter 142 may in turn convert into a single corresponding browser-renderable frame image 144, which base64 encoder may in turn encode into a single corresponding content-transfer encoded frame image 146, which image object creator 148 may in turn use to create a single frame image object 124 to be added to frame image buffer 126.

Frame image processor 136 of the illustrated embodiment is optional. In other embodiments, any of the functionalities of frame image processor 136 may be incorporated into decoder 122 and/or into video playback interface 130 (described further below). By way of non-limiting example, the functionality of frame image converter 142 may be incorporated into decoder 122 and the functionality of image object creator may be incorporated into video playback interface 130. In another non-limiting example, the functionality of all of frame image processor 136 may be incorporated into decoder 122.

Video data queue monitor 110 may be configured to clear video data 114 (or video content 116) from video data queue 112 after video data 114 has been decoded by decoder 122. In some embodiments, video data queue monitor 110 is configured to request video content 116 (and/or video data 114 contained therein) from a video content source (for example, a remote server) based on the amount of video data 114 in video data queue 112 that has yet to be decoded by decoder 122. For example, video data queue monitor 110 may be configured to request video content 116 and/or video data 114 whenever video data queue 112 contains less than a threshold amount of video data 114 that has yet to be decoded by decoder 122—for example, a threshold amount of video data 114 corresponding to a suitable threshold number of frame images 124. Where video data 114 comprises a portion of a known length video segment (for example, a pre-recorded program, film clip, movie, etc.) or when the end of video data 114 is otherwise discernable, video data queue monitor 110 may be configured to stop requesting video content 116 and/or video data 114 after a portion of video data 114 constituting the end of video data 114 has been placed into video data queue 112.

System 100 comprises video playback interface 130. The functionality of video playback interface 130 may be implemented directly by the script when the script is interpreted by the internet browser. Video playback interface 130 is configured to synchronize the display of frame images 124 by a frame renderer 132 (e.g. to the playback of audio data) or to otherwise cause frame renderer 132 to display frame images 124 at appropriate times. Frame renderer 132 may be implemented in whole or in part by an image rendering engine provided natively on an internet browser operating on a user-computing device, for example. Frame renderer 132 may comprise invoking a drawImage( ) method and/or a putImageData method having as (one of) its argument(s) an ImageData object comprising a frame image 124.

In some embodiments, video playback interface 130 is configured to cause frame renderer 132 to display frame images 124 at a rate that is approximately equal to the frame rate of video data 114. In some embodiments, video playback interface 130 is configured to cause frame renderer 132 to display frame images 124 at a rate that is less than the frame rate of video data 114 and optionally to display interpolated images between the display of frame images 124. In some embodiments, video playback interface 130 may cause frame renderer 132 to display frame images 124 at a user-configurable rate. Video playback interface 130 may be configured to cause frame renderer 132 to render frame images 124 at least approximately synchronously with the rendering of audio data 164 that accompanies video data 114 in video content 116, within some suitable tolerance. Because video playback interface 130 may control the timing of the rendering of frame images 124 by frame renderer 132, video playback interface 130 may be referred to as playback timing monitor 130.

Figure 2B:
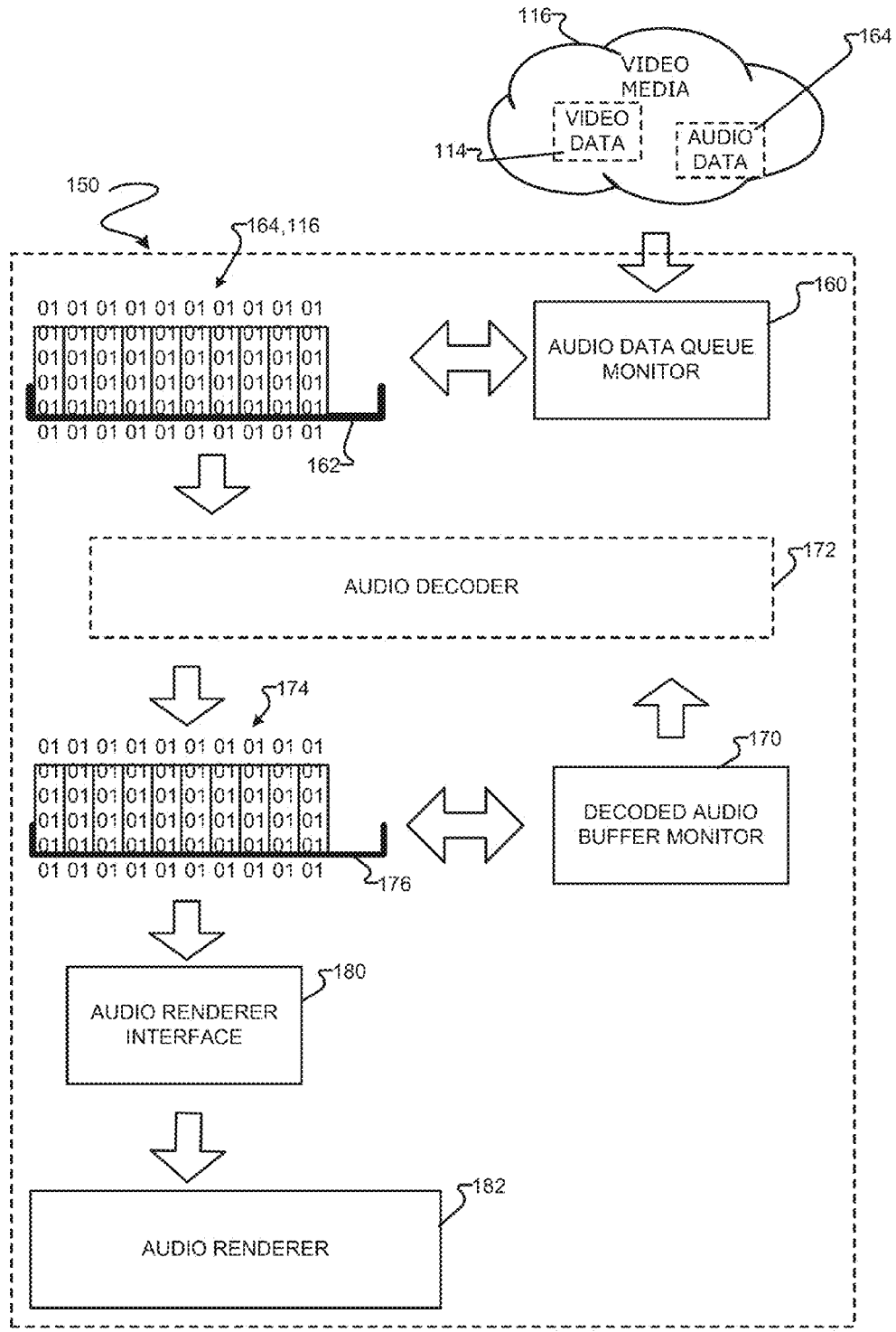
FIG. 2B is a schematic block diagram of an audio rendering system according to an example embodiment.

FIG. 2B is a schematic block diagram of an audio rendering system 150 according to an example embodiment. In some embodiments, audio rendering system 150 is implemented, at least in part, using a cross-platform script interpreted by an internet browser operating on a user-computing device. In some embodiments, part of audio rendering system 150 is implemented natively by the internet browser interpreting a script. In some embodiments, the script directly performs or implements some of the functionalities of audio rendering system 150. In some embodiments, all or portions of video rendering system 100 (FIG. 2A) and audio rendering system 150 (FIG. 2B) may be integrated with one another. In some embodiments such as the exemplary embodiment shown in FIGS. 2A and 2B, video rendering system 100 (FIG. 2A) and audio rendering system 150 (FIG. 2B) may be separately implemented. In some respects, audio rendering system 150 is similar to video rendering system 100 described above. Audio rendering system 150 may retrieve video content 116 in the same manner as video rendering system 100. Video content 116 retrieved by video rendering system 100 may be accessible to audio rendering system 150 and vice versa.

As discussed above, video content 116 provided to audio rendering system 100 may generally include video data 114, audio data 164, image data (not shown), metadata (not shown) and/or the like. Audio rendering system 150 of the illustrated embodiment comprises an audio data queue monitor 160 configured to cause audio data 164 from video content 116 to be stored in a data structure embodying an audio queue 162 and to monitor audio data queue 162. Audio data queue monitor 160 may be analogous to video data queue monitor 110 of video rendering system 100. In some embodiments, audio data queue monitor 160 is implemented in an internet browser operating on a user-computing device. In some embodiments, storing audio data 164 in audio data queue 162 comprises de-multiplexing audio data 164 from video data 114 and other data (for example, image data, metadata and/or the like) which may form part of video content 116. This de-multiplexing functionality may be implemented by audio data queue monitor 160. In general, however, audio data queue monitor 160 need not perform this de-multiplexing functionality. As discussed above, in some embodiments, audio data 164 may be de-multiplexed by another de-multiplexer (not shown) prior to being received by audio rendering system 150. In still other embodiments, data stored in audio data queue 162 is not yet de-multiplexed and audio data 164 may be de-multiplexed from video data 114 and/or other data while being decoded by decoder 172. In such embodiments, video data queue 112 and audio data queue 162 may both be implemented by the same video content queue (not shown) which may store video content 116.

Audio rendering system 150 comprises an audio decoder 172. Audio decoder 172 decodes audio data 164 to provide decoded audio data 174. In particular embodiments, audio decoder 172 is directly implemented by a script when the script is interpreted by an internet browser. Audio rendering system 150 of the illustrated embodiment comprises a decoded audio buffer monitor 170. Decoded audio buffer monitor 170 is configured to cause a decoder 172 decode audio data 164 contained in audio data queue 162 to produce decoded audio data 174, which is stored in a data structure embodying a decoded audio buffer 176. Decoded audio buffer monitor 170 may be implemented natively by an internet browser. In some embodiments, the functionality of decoded audio buffer monitor 170 is implemented directly by the script when the script is interpreted by an internet browser. Decoded audio buffer monitor 170 may be configured to cause decoder 172 to continually decode audio data 164 and to generate decoded audio data 174 until there is at least a threshold amount of decoded audio data 174 in decoded audio buffer 176 (for example, until decoded audio buffer 176 is full). Decoded audio data 174 may comprise audio data in a format that can be rendered natively by an internet browser operating on a user-computing device (for example, using the browser's native audio playback function(s)). In some embodiments, audio rendering system 150 may comprise an audio data processor (not shown) comprising one or more functionalities to convert audio data 164 into a decoded format 174 suitable for use by an internet browser operating on a user-computing device using native audio playback functionalities. In some embodiments, such functionalities can be performed by decoder 172 and/or audio renderer interface 180.

Audio data queue monitor 160 may be configured to clear audio data 164 (or video content data 116) from audio data queue 162 after audio data 164 has been decoded by decoder 172. In some embodiments, audio data queue monitor 160 is configured to request video content 116 (and/or audio data 164 contained therein) from a video content source (for example, a remote server) based on the amount of audio data 164 in audio data queue 162 that has yet to be decoded by decoder 172. For example, audio data queue monitor 160 may be configured to request video content 116 and/or audio data 164 whenever audio data queue 162 contains less than a threshold amount of audio data 164 that has yet to be decoded by decoder 172. When the end of audio data 164 is detectable, audio data queue monitor 160 may be configured to stop requesting video content 116 and/or audio data 164 after a portion of audio data 164 constituting the end of audio data 164 has been placed into audio data queue 162.

Audio rendering system 150 comprises audio renderer interface 180. Audio renderer interface 180 is configured to provide (for example, to load) decoded audio data 174 to audio renderer 182 in a format suitable for use by audio renderer 182. Audio renderer 182 may comprise an audio playback engine provided natively in an internet browser operating on a user-computing device, for example. In some embodiments, audio renderer 182 may use dedicated audio rendering hardware and may render (for example, playback) the audio data in one or more process(es) parallel to the process(es) running on the main user-computing device processor. In some embodiments, audio renderer 182 may be implemented (at least in part) using the main user-computing device processor, but may still be implemented in one or more processing thread(s) that run parallel to that of the thread(s) responsible for video rendering system 100 and audio rendering system 150. In some embodiments, audio renderer interface 180 may optionally be configured to ascertain playback timing information (for example, an audio playback time reference) associated with the rendering of decoded audio data 174 by audio renderer 182. The playback timing information obtained by audio renderer interface 180 may be obtained natively by the internet browser. Other functionalities of audio renderer interface 180 may be directly performed by the interpreted script. This playback timing information can be used by frame image renderer 132 and/or video playback interface 130 (FIG. 2A) to cause frame images 124 to be rendered by frame renderer 132 at a rate that is approximately synchronous with the rendering of decoded audio data 174 by audio renderer 182.

In some embodiments, it may be possible to de-multiplex an entire stream of audio data 164 from video content 116 and to buffer the entire stream of audio data 164 in audio data queue 162. In such embodiments, audio data queue monitor 160 need not actively monitor the status of audio data queue 162 to determine when to retrieve more audio data 164. Instead, audio data queue monitor 160 may make a single request for audio data 164. Similarly, in such embodiments, the entire stream of audio data 164 may be decoded by decoder 172 and stored as decoded audio data 174 in decoded audio buffer 176. In such embodiments, decoded audio buffer monitor 170 need not actively monitor the status of decoded audio buffer 176 and may instead make a single request for the stream of audio data 164 to be decoded by decoder 172 and placed in decoded audio buffer 176.

Some internet browsers comprise native functionality that allows them to natively render encoded audio data 164. By way of non-limiting example, Firefox™ can natively handle the Vorbis encoded audio format and Safari™ and Internet Explorer™ can natively handle the mp3 encoded audio format. In such embodiments, decoder 172, decoded audio buffer 176 and decoded audio buffer monitor 170 may not be required and audio renderer interface 180 can provide encoded audio data 164 from audio data queue 162 directly to audio renderer 182.

In some embodiments, the functionality of video rendering system 100 and/or audio rendering system 150 is achieved, at least in part, by one or more methods implemented using a cross-platform script embedded in an HTML document. Such a script may be interpreted by a script interpreter provided embodied as part of an application program operating at a user-computing device. For example, such a script interpreter may be a part of the internet browser. The interpretation of such a script by the script interpreter may cause execution of logical and/or arithmetic operations, and instantiation and/or manipulation of data structures, which provide functionality of video rendering system 100 and/or audio rendering system 150.

Figure 3:
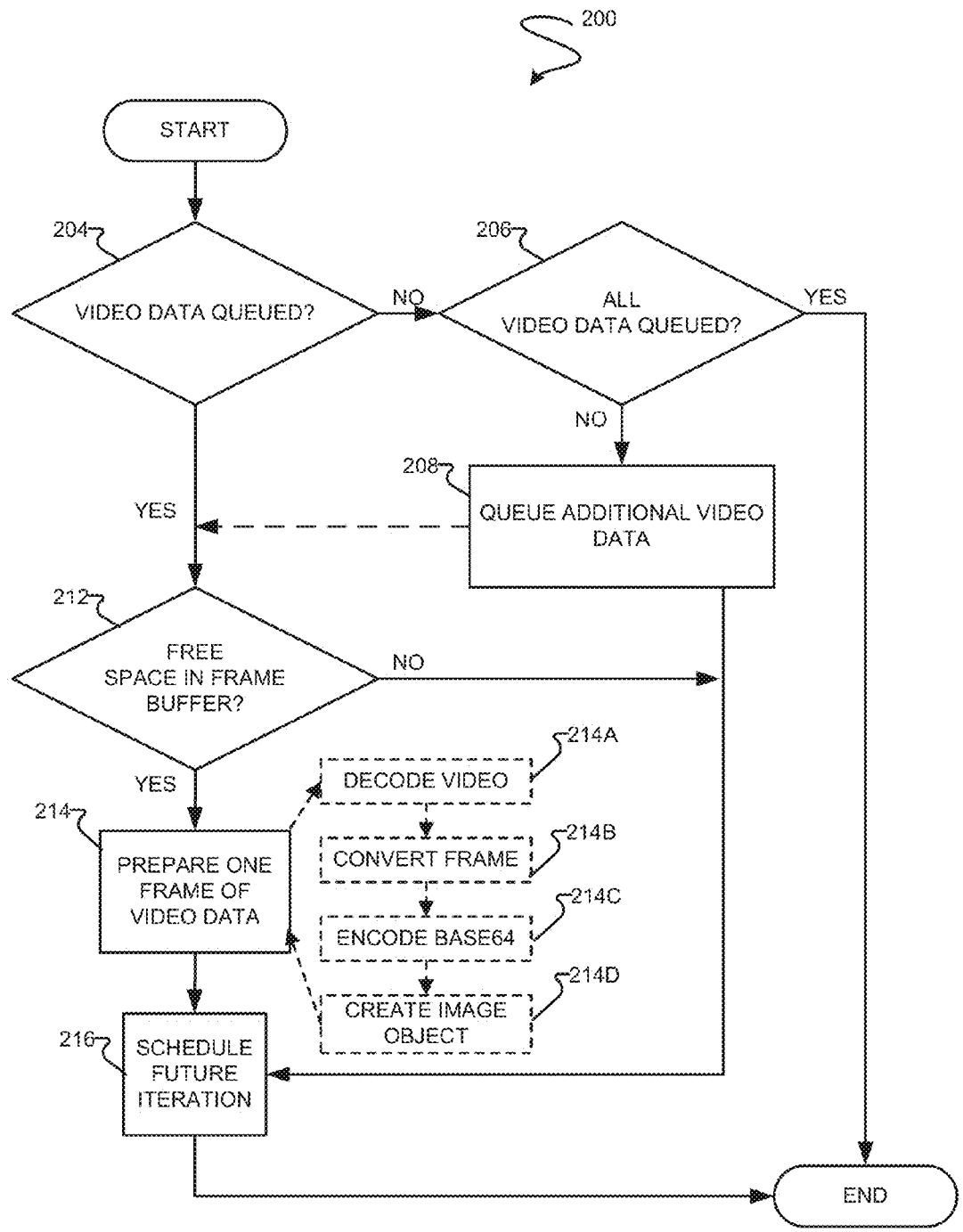
FIG. 3 is a flow chart of a video data queuing and decoding method according to an example embodiment.
Figure 4:
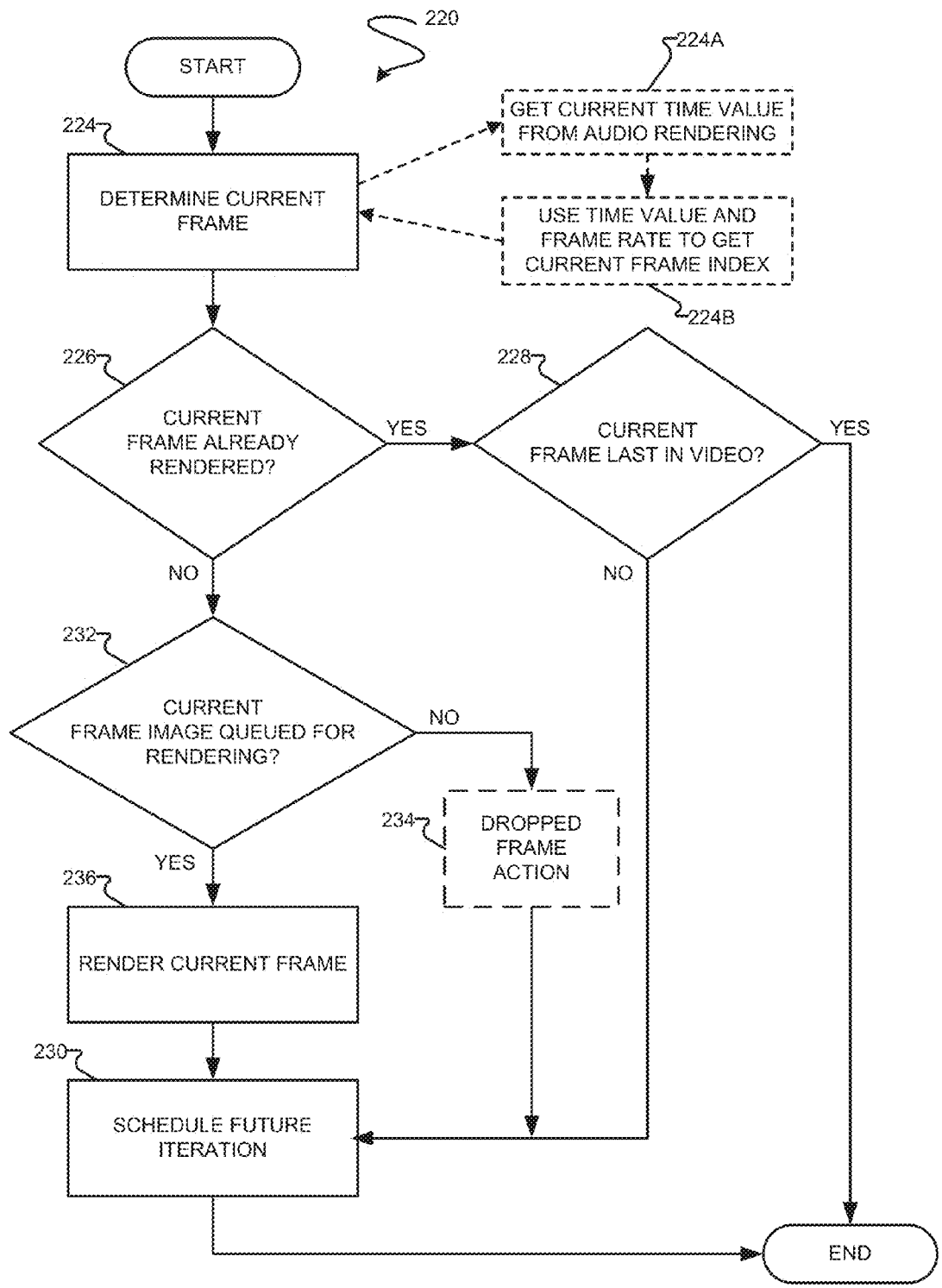
FIG. 4 is a flow chart of a video data rendering method according to an example embodiment.

In some embodiments, the functionality of video rendering system 100 is achieved, at least in part, by the script interpreter implementing two methods: one method providing the video data queuing, decoding and preparation functionalities of system 100 (for example, by implementing video data queue monitor 110, frame buffer monitor 120, decoder 122 and frame image processor 136) and another method providing the frame image synchronization and rendering functionalities of system 100 (for example, by implementing video playback interface 130 and, optionally, frame image renderer 132). FIG. 3 schematically depicts an implementation of this first method for queuing, decoding and preparing video data according to a particular embodiment. FIG. 4 schematically depicts an implementation of this second method for synchronizing and rendering frame images of the video data according to a particular embodiment. The script interpreter may be caused to repeatedly perform these two methods in asynchronous fashion to incrementally queue, decode, prepare, synchronize and render video data. Such incremental queuing, decoding, preparing, synchronizing and rendering of video data may be advantageous where the methods are implemented in a script that is interpreted by a single-threaded interpreter.

FIG. 3 is a flowchart of a method 200 for obtaining and decoding video data according to an example embodiment. Method 200 may be implemented natively by an internet browser operating on a user-computing device, when the browser interprets a cross-platform script (or part of a script). For example, method 200 may be implemented as a set of scripted instructions (for example, a set of Javascript instructions). Particular functionalities of method 200 may be implemented directly by the script when the script is interpreted. In the illustrated embodiment, method 200 commences in block 204 which involves an inquiry as to whether at least a threshold amount of video data is queued for decoding. In some embodiments, block 204 comprises determining whether a video data queue (for example, video data queue 112 of system 100 (FIG. 2A)) contains at least one frame of video data that has yet to be decoded.

If the block 204 inquiry determines that there is less than the threshold amount of video data queued (block 204, NO branch), method 200 proceeds to block 206. Block 206 comprises an inquiry into whether all available video data has been queued. Block 206 may comprise, for example, determining whether an end portion of the video segment (for example, an end portion of a known length video segment or an otherwise discernable end portion of a video segment) has been placed in the video data queue. If the block 206 inquiry determines that all available video data has been queued (block 206, YES branch), method 200 ends.

If the block 206 inquiry determines that there is still unqueued video data available (block 206, NO branch), method 200 proceeds to block 208. Block 208 involves causing more video data to be placed in the video data queue. By way of non-limiting illustration, in a particular example embodiment, method 200 is implemented as a set of Javascript instructions and block 208 comprises invoking the open( ) method of an AJAX XMLHttpRequest object corresponding to video data hosted on a server. This block 208 functionality requests that the internet browser retrieve some video data in a format that can be interpreted by Javascript. Where possible in the user-computing device, this block 208 functionality of retrieving video data can be performed by the internet browser as a parallel thread (in a multi-threaded environment) or as a parallel process (in a multiprocessing environment) to that of the remainder of method 200. For example, a script interpreter of the internet browser can perform one parallel thread/process to implement method 200 while the internet browser implements a second parallel thread/process to implement block 208.

In some embodiments, block 208 comprises obtaining only an incremental amount of video data (for example, by specifying a particular portion or particular amount of video data to be placed in the video data queue, such as by indicating a byte range in a Range header field of an HTTP request, for instance). In such embodiments, block 208 may comprise updating an index, range or the like that tracks what video data has been requested and/or placed in the video data queue.

After block 208, method 200 proceeds to block 216, which is described below. In some embodiments, method 200 may proceed to block 212 after block 208. In some embodiments, block 206 is omitted (for example, if it is determined in block 204 that there is not at least one frame of video data queued (block 204, NO branch), method 200 may attempt to cause video data to be queued (for example, perform block 208) without determining whether there is available video data to be queued).

Returning to block 204, if the block 204 inquiry determines that there is at least one frame of video data queued (block 204, YES branch), method 200 proceeds to block 212. Block 212 comprises determining whether there is sufficient free space (for example, free space sufficient to store a decoded frame image) in a frame image buffer (for example, frame image buffer 126 of system 100 (FIG. 2A)). If the block 212 inquiry determines that there is not free space in the frame image buffer (block 212, NO branch), method 200 proceeds to block 216. If the block 212 inquiry determines that there is free space in the frame image buffer (block 212, YES branch), method 200 proceeds to block 214.

In the illustrated embodiment, block 214 comprises preparing one frame of queued video data into a frame image suitable for rendering (for example, frame image 124 (FIG. 2A)) and placing the prepared frame image into the frame image buffer (for example, frame image buffer 126 (FIG. 2A).

Block 214 may comprise preparing video data corresponding to (or comprising) the next un-decoded frame image in a sequence of frame images, for example. In some embodiments, frame images prepared in block 214 comprise images in a format that can be natively rendered by an internet browser operating on a user-computing device that is interpreting a script implementing all or part of method 200. By way of non-limiting illustration, in a particular example embodiment, method 200 is implemented as a set of scripted instructions (for example, a set of Javascript instructions) and block 214 comprises preparing video data into an ImageData object, which may comprise a CanvasPixelArray object containing an array of RGB pixel values. In another example embodiment, block 214 comprises preparing video data into a frame image in a format that can be natively displayed by an internet browser operating on a user-computing device (for example, PNG, JPEG, GIF, etc.).

Block 214 may generally comprise any or any combination of the following example operations:
  performing arithmetic and/or logical operations;
  creating, deleting and/or modifying data structures and/or data stored therein;
  performing one or more sets of scripted instructions, accessing executable libraries natively available to the script interpreter, etc.;
  causing the browser to invoke native browser functions (for example, where queued video data comprises (or can be converted to) JPEG image data, block 214 may involve causing the browser to invoke native JPEG rendering functionality of an internet browser operating on a user-computing device to obtain an array of RGB pixel values); and/or
  the like.

In the particular case of the illustrated embodiment, preparation of the frame image in block 214 comprises:
  decoding the video data (for example, video data 114 from video data buffer 112) in block 214A to generate a decoded frame image (for example, decoded frame image 140);
  optionally converting the decoded frame image into a file format that is natively renderable by the internet browser in block 214B to generate a browser-renderable frame image (for example, browser-renderable frame image 144);
  optionally encoding the browser-renderable frame image into a content transfer format in block 214C to generate a content-transfer encoded frame image (for example, content-transfer encoded frame image 146); and
  optionally creating an frame image object (for example, frame image object 124) from the frame image in block 214D.

Block 214 may also optionally include image-related processing of decoded frame images, such as adjusting contrast, brightness, sharpness, etc.

After block 214, method 200 proceeds to block 216 which involves scheduling a subsequent iteration of method 200 for a time in the future. By way of non-limiting illustration, in a particular example embodiment, method 200 is implemented as a set of scripted instructions (for example a set of Javascript instructions) and block 216 comprises invoking the setTimeout( ) method to schedule the set of Javascript instructions that implements method 200 after a specified amount of time has elapsed. In another particular example embodiment, method 200 is implemented as a set of scripted instructions (for example, a set of Javascript instructions) and the setInterval( ) method may be used to schedule the set of Javascript instructions that implements method 200 after a specified amount of time has elapsed. In such embodiments, block 216 may not be expressly necessary for each iteration of method 200. In particular embodiments, successive iterations of method 200 may be scheduled at intervals less than the frame interval (i.e. (frame rate)$^{-1}$) of the video data being rendered. In some embodiments, the scheduled method 200 intervals are less than 50% of the frame interval of the video data being rendered. In some embodiments, the scheduled method 200 intervals are less than 20% of the frame interval of the video data being rendered. In some embodiments, the scheduled method 200 intervals are less than 10% of the frame interval of the video data being rendered. After the next iteration of queuing and decoding method 200 is scheduled in block 216, method 200 ends and control is passed back to the internet browser and its script interpreter.

In the illustrated embodiment, in each iteration of method 200 which involves block 214, block 214 comprises preparing a frame of video data from its encoded format in the video data buffer (for example, video data buffer 112) through to a format suitable for rendering (for example, an frame image object 124 in frame image buffer 126). This frame image processing can involve multiple steps including: decoding (block 214A), image format conversion (block 214B), content-transfer encoding (block 214C) and image object preparation (block 214D). In some circumstances (such as where the user-computing device processing resources are relatively limited or slow), the amount of processing involved in performing all of these steps is undesirably large. Consequently, in some embodiments, method 200 may be modified so that some subset of the steps of blocks 214A, 214B, 214C, 214D is performed for each iteration of method 200 which reaches block 214. For example, each iteration of method 200 which reaches block 214 may involve performing only one of blocks 214A, 214B, 214C, 214D. This will reduce the processing time associated with each iteration of method 200. Suitable logic may be defined to select between blocks 214A, 214B, 214C, 214D in each iteration. By way of non-limiting example, such logic may ascertain which queue (for example, from among queues 138, 141, 143, 126 (FIG. 2A)) has the fewest number of frame images and may select which of 214A, 214B, 214C, 214D to perform on this basis.

As discussed above, method 200 may be implemented natively by an internet browser operating on a user-computing device, when the browser interprets a cross-platform script (or part of a script). Particular functionalities of method 200 may be implemented directly by the script when the script is interpreted. For example, in particular embodiments, the functionalities of any of blocks 204, 206, 212, 214A, 214B, 214C may be performed directly by the script when it is interpreted.

FIG. 4 is a flowchart of a method 220 for synchronizing and rendering queued frame images according to an example embodiment. Method 220 may be implemented natively by an internet browser operating on a user-computing device, when the browser interprets a cross-platform script (or part of a script). For example, method 200 may be implemented by set of scripted instructions (for example, a set of Javascript instructions). Particular functionalities of method 220 may be implemented directly by the script when the script is interpreted.

Block 224 of method 220 comprises determining a current frame image to be rendered. Block 224 may comprise, for example, determining a current video frame index based on a frame rate of the video data being rendered and a current time value. A particular non-limiting embodiment of a method for determining a current video frame index suitable for use in block 224 is shown in optional blocks 224A and 224B. Block 224A involves procuring a current time value from a suitable source. In the illustrated embodiment, the block 224A current time value is obtained from the rendering of audio data which accompanies the video data within the video content. In one non-limiting embodiment, the block 224A current time value is obtained from the rendering of audio data 164 from within video content 116 (see FIG. 2B). As mentioned above, in particular embodiments, audio renderer interface 180 (FIG. 2B) of audio rendering system 150 may monitor the timing of audio playback by audio renderer 182 (e.g. relative to a reference point such as the start of audio playback or the like) and may be queried in block 224A for a current audio playback time reference. In some such embodiments, audio renderer interface 180 may be implemented directly by the script to procure the audio playback time reference. In other embodiments, audio renderer interface 180 may make use of native browser functionalities to procure the audio playback time reference. In another non-limiting example embodiment, method 220 is implemented as a set of scripted instructions (for example a set of Javascript instructions), and block 224A may involve causing the browser to invoke the audio.buffered.end method on an associated audio object to obtain a value indicating the time of the last rendered (or about to be rendered) segment of the associated audio data. This exemplary embodiment may be implemented natively by the browser and need not rely on audio renderer interface 180.

In the illustrated example embodiment, block 224B, which may be implemented directly by the script, involves multiplying the block 224A current time value (for example, the current audio playback time reference) by the video data frame rate to obtain the desired block 224 current video frame index. In some implementations, the product of the block 224A current time value and the video data frame rate may be rounded to the nearest integer to provide the desired block 224 current video frame index. In Javascript-based implementations, where it is not possible to round up, this block 224B rounding operation may be performed by adding 0.5 to the product and rounding down to the nearest integer.

In some internet browsers, it may be the case that audio buffering information is updated less frequently than the frame rate of the video data being rendered (for example, two or more frame periods may elapse between successive updates of the audio buffering information). To ameliorate synchronization issues that may arise from this, block 224 may comprise determining an amount of time elapsed since the last time block 224 (or another block of method 200) was performed, and determining the current block 224 video frame index based on a combination of: this elapsed time; and the block 224 video frame index determined the last time block 224 was performed. This elapsed time may be measured or otherwise determined from a system clock or the like.

Block 226, which may be implemented directly by the script, comprises determining whether the frame image referenced by the current block 224 video frame index has already been rendered. Block 226 may avoid duplicate rendering of the same frame in circumstances where method 220 is performed twice within the period of a single video frame. In some embodiments, block 226 comprises comparing the current block 224 video frame index to the block 224 video frame index determined in a previous iteration of method 220 (for example, the immediately preceding iteration).

If the block 226 inquiry determines that the video frame corresponding to the current block 224 video frame index has already been rendered (block 226, YES branch), method 220 proceeds to block 228. Block 228, which may be implemented directly by the script, comprises determining whether the current block 224 video frame index references the last frame of video data being rendered (for example, the final frame of a known length video segment). If in block 228 it is determined that the current block 224 video frame index references the last frame in the video data being rendered (block 228, YES branch), method 220 ends. If the block 228 inquiry determines that the current block 224 video frame index does not reference the last frame in the video data being rendered (block 228, NO branch), method 220 proceeds to block 230, which is described below.

Returning to block 226, if the block 226 inquiry determines that the video frame corresponding to the current block 224 video frame index has not already been rendered (block 226, NO branch), method 220 proceeds to block 232. Block 232, which may be implemented directly by the script, involves an inquiry into whether the frame image corresponding to the current block 224 video frame index (for convenience, the "current frame image") is queued for rendering. Block 232 may comprise determining whether the current frame image is present in a frame image buffer populated by method 200 (FIG. 3), for example. If the block 232 inquiry determines that the current frame image is not queued for rendering (block 232, NO branch), method 220 proceeds to block 230. Before proceeding to block 230, method 220 may initiate and/or perform one or more optional dropped frame actions in block 234. By way of non-limiting example, the block 234 dropped frame action may involve recording the fact that the current frame image was not available for rendering (for example, for statistical and/or analysis purposes), pausing playback of an associated audio track (for example, to permit queued frames to catch up to a current frame determined by audio playback), indicating (for example, to another process, method, or the like) that frame images should be queued more quickly (such as by obtaining video data at a faster rate, decoding frames more often, switching to a lower bitrate or lower frame rate video source, etc.), and/or the like. The block 234 drop frame actions may be initiated directly by the script. Performing some of the possible block 234 drop frame actions may also be implemented directly by the script. Performing others of the possible block 234 drop frame actions may involve the use of one or more native browser functionalities. In some embodiments, optional block 234 may comprise some logic which may be used to determine whether or not a drop frame action should be initiated. In some embodiments, actions similar to the block 234 drop frame actions may be taken in other circumstances where it is known that a frame is dropped—for example, in circumstances where the block 224 current frame index is more than 1 count greater than the last block 224 frame index (from the preceding iteration of method 220) indicating that one or more frames have been dropped between successive iterations of method 220.

If the block 232 inquiry determines that the current frame image is queued for rendering (block 232, YES branch), then method 220 proceeds to block 236. Block 236 comprises rendering the current frame image. In embodiments where method 220 is implemented using a script interpreted by an internet browser operating on a user-computing device, block 236 may comprise, for example, rendering the current frame image using a native image rendering functionality of the internet browser. By way of non-limiting illustration, in a particular example embodiment, method 220 is implemented as a set of scripted instructions (for example a set of Javascript instructions), and block 236 comprises invoking a putImageData method having as (one of) its argument(s) an ImageData object, which comprises a CanvasPixelArray object containing an array of RGB pixel values representing the frame image (for example, frame image 124 (FIG. 2A)) to be rendered. In another example embodiment, block 236 comprises invoking a drawImage method having as (one of) its argument(s) an image object (for example, frame image 124 (FIG. 2A)).

After block 236, method 220 proceeds to block 230. Block 230 involves scheduling a subsequent iteration of method 220 for a time in the future. In some embodiments, block 230 may comprise the use of one or more native browser functionalities. By way of non-limiting illustration, in a particular example embodiment, method 220 is implemented as a set of scripted instructions (for example, a set of Javascript instructions) and block 230 comprises invoking the setTimeout( ) method to schedule the set of Javascript instructions that implements method 220 after a specified amount of time has elapsed. In another particular example embodiment, method 220 is implemented as a set scripted instructions (for example, a set of Javascript instructions) and the setInterval( ) method may be used to schedule the set of Javascript instructions that implements method 220 after a specified amount of time has elapsed. In such embodiments, block 230 may not be expressly necessary for each iteration of method 220. In particular embodiments, successive iterations of method 220 may be scheduled at intervals less than the frame interval (i.e. (frame rate)$^{-1}$) of the video data being rendered. In some embodiments, the scheduled method 220 intervals are less than 50% of the frame interval of the video data being rendered. In some embodiments, the scheduled method 220 intervals are less than 20% of the frame interval of the video data being rendered. In some embodiments, the scheduled method 220 intervals are less than 10% of the frame interval of the video data being rendered. After the next iteration of video rendering method 220 is scheduled in block 230, method 220 ends and control is passed back to the script interpreter.

As discussed above, method 220 may be implemented natively by an internet browser operating on a user-computing device, when the browser interprets a cross-platform script (or part of a script). Particular functionalities of method 220 may be implemented directly by the script when the script is interpreted. For example, in particular embodiments, the functionalities of any of blocks 224B, 226, 228, 232, 234 may be performed directly by the script when it is interpreted.

In the illustrated embodiments, method 200 prepares no more than one frame of video data each time that it is performed, and method 220 renders no more than one frame image each time it is performed. This implementation may be advantageous where methods 200 and 220 are implemented iteratively and asynchronously interpreted by the same script interpreter of an application program executing in a single thread of execution (for example, the Javascript interpreter of some typical internet browsers). For example, such an implementation may permit method 220 to render frame images decoded by method 200 between successive iterations of method 200. In other embodiments, multiple frames of video data may be procured and/or prepared in each iteration of method 200 and/or multiple frame images may be rendered in each iteration of method 220. Also, as discussed above, in some embodiments, one frame image of video data may be partially prepared (for example, a subset of blocks 214A, 214B, 214C, 214D) in each iteration of method 200.

In some embodiments, methods 200 and 220 are configured to schedule subsequent iterations of themselves at regular intervals (for example, the scheduled period between successive iterations may be constant across iterations). These scheduled intervals may be shorter than the maximum time between successive iterations of methods 200 and 220 that may elapse yet still permit video data to be queued, prepared, synchronized and rendered at the frame rate of the video data. This may be advantageous in embodiments where methods 200 and 220 are implemented by a script that is interpreted by the script interpreter of an application program that cannot guarantee that future iterations of methods 200 and 220 will occur at their scheduled times (for example, because operation of the interpreter it is pre-empted by other processes running on the same thread of execution as the interpreter, because future iterations of methods 200 and 220 are pre-empted by other scheduled and/or ongoing operations of the interpreter, etc.). Scheduling successive iterations more frequently than would strictly be required if methods 200 and 220 were running on dedicated threads may provide a margin for helping to ensure that methods 200 and 220 are performed in time to provide video display that is satisfactory to human observers.

Methods 200 and 220 may be configured to have the same inter-repetition period, or different inter-repetition periods. In some embodiments, method 200 is configured to be performed more frequently than method 220. By way of non-limiting illustration, in a particular example embodiment, method 200 is configured to schedule successive iterations at a predetermined inter-repetition period of between 1 ms and 10 ms, and method 220 is configured to schedule successive iterations at a predetermined inter-repetition period of between 5 ms and 25 ms. In other embodiments, method 220 may be configured to schedule successive iterations at a predetermined inter-repetition period of between 1 ms and 10 ms.

Inter-repetition periods of methods 200 and/or 220 may be determined dynamically. For example, method 200 and/or method 220 may dynamically determine their inter-repetition periods based on the time actually elapsed between successive iterations. For another example, inter-repetition periods of methods 200 and 220 may be coordinated (for example, method 220 may dictate the inter-repetition period of method 200, or vice versa). In some embodiments, one or both of methods 200 and 220 may be multiply instantiated, such that there are a plurality of one or both methods continually scheduling successive iterations of themselves (for example, at the same inter-repetition periods or at different inter-repetition periods).

Figure 5:
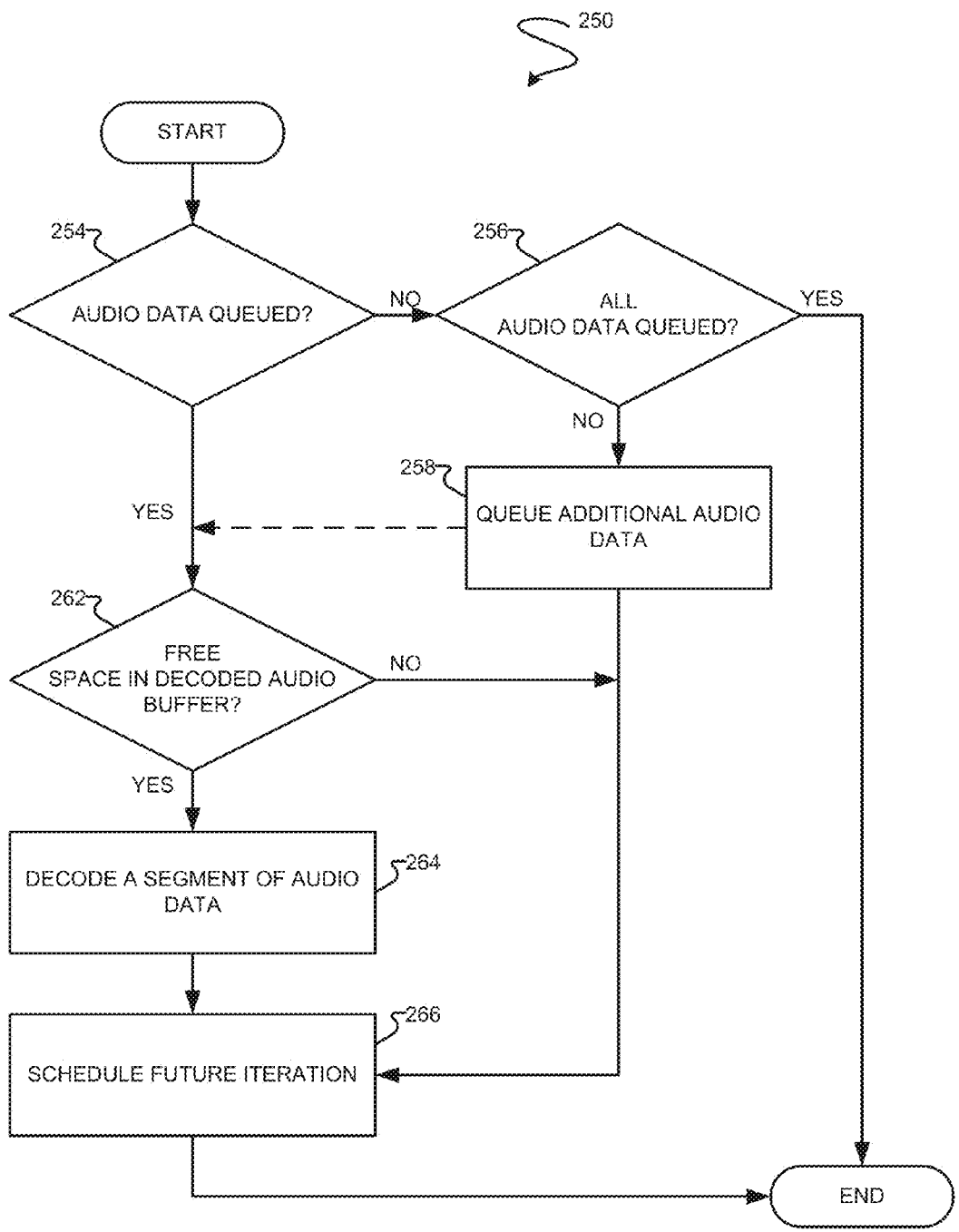
FIG. 5 is a flow chart of an audio data queuing and decoding method according to an example embodiment.
Figure 6:
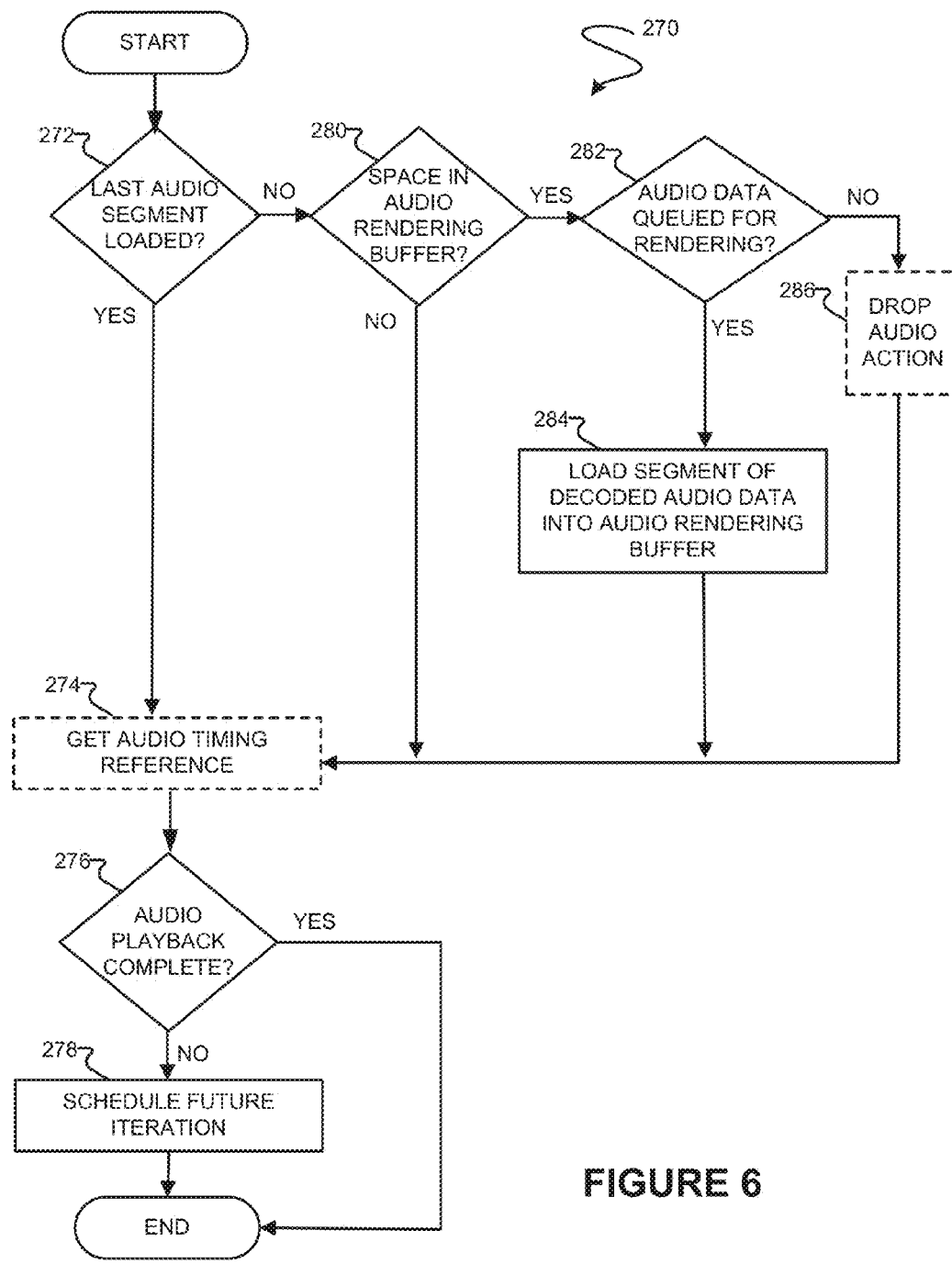
FIG. 6 is a flow chart of a method for implementing an audio renderer interface according to a particular embodiment.

Turning now to audio rendering system 150 (FIG. 2B), in some embodiments, the functionality of audio rendering system 150 is achieved, at least in part, by the script interpreter of an application program implementing two methods: one method providing the audio data queuing and decoding functionalities of system 150 (for example, by implementing audio data queue monitor 160, decoded audio buffer monitor 170 and decoder 172) and another method providing the audio renderer interface (for example, audio renderer interface 180) for interfacing with audio renderer 182. FIG. 5 schematically depicts an implementation of this first method for queuing and decoding (or otherwise preparing) audio data according to a particular embodiment. FIG. 6 schematically depicts an implementation of this second method for implementing the audio renderer interface according to a particular embodiment. The script interpreter may be caused to repeatedly perform these two methods in asynchronous fashion to incrementally queue, decode and otherwise prepare audio data and to interface with audio renderer 182. Such incremental queuing, decoding and interfacing of audio data with audio renderer 182 may be advantageous where the methods are implemented in a script that is interpreted by a single-threaded interpreter.

FIG. 5 is a flowchart of a method 250 for obtaining, decoding and otherwise preparing audio data according to an example embodiment. Method 250 may be implemented natively by an internet browser operating on a user-computing device, when the browser interprets a cross-platform script (or part of a script). For example, method 250 may be implemented as a set of scripted instructions (for example, a set of Javascript instructions). Particular functionalities of method 250 may be implemented directly by the script when the script is interpreted. In many respects, method 205 may be analogous to the video data queuing, decoding and preparing method 200 of FIG. 3. In the illustrated embodiment, method 250 commences in block 254 which involves an inquiry as to whether at least a threshold amount of audio data is queued for decoding. In some embodiments, block 254 comprises determining whether an audio data queue (for example, audio data queue 162 of system 150 (FIG. 2B)) contains at least one segment of audio data that has yet to be decoded. The length of audio segments used in method 250 (and in method 270 described below) may comprise a configurable constant (for example, which may depend on available processing resources at the user-computing device) or may comprise a dynamically determined variable which determined each time that a segment of audio data is used or each time that a piece of audio data 164 is rendered. In some embodiments, each audio segment used in methods 250, 270 may comprise a suitable number (for example, one) of frame(s) of audio data, although this is not necessary. In some embodiments, each audio segment used in methods 250, 270 may comprise a suitable length (for example, 1 second) of playback time. In some embodiments, each audio segment used in methods 250, 270 may comprise a suitable number (e.g. 44,000) of audio samples.

If the block 254 inquiry determines that there is less than the threshold amount of audio data queued (block 254, NO branch), method 250 proceeds to block 256 which involves an inquiry into whether all available audio data has been queued. Block 256 may comprise, for example, determining whether an end portion of the audio data has been stored in the audio data queue. If the block 256 inquiry determines that all available audio data has been queued (block 256, YES branch), method 200 ends. If the block 256 inquiry determines that there is still unqueued audio data available (block 256, NO branch), method 250 proceeds to block 258 which involves causing more audio data to be placed in the audio data queue. Block 258 may be similar to block 208 of method 200 (FIG. 3), except that audio data (rather than video data) is procured and that audio data is added to the audio data queue (rather than the video data queue).

After block 258, method 250 proceeds to block 266, which is described below. In some embodiments, method 250 may proceed to block 262 after block 258. In some embodiments, block 256 is omitted (for example, if it is determined in block 254 that there is not at least one segment of audio data queued (block 254, NO branch), method 250 may attempt to cause audio data to be queued (for example, perform block 258) without determining whether there is available audio data to be queued).

Returning to block 254, if the block 254 inquiry determines that there is at least one segment of audio data queued (block 254, YES branch), method 250 proceeds to block 262 which involves determining whether there is sufficient free space (for example, free space sufficient to store a decoded segment of audio data) in a decoded audio buffer (for example, decoded audio buffer 176 of system 150 (FIG. 2B)). If the block 262 inquiry determines that there is not free space in the decoded audio buffer (block 262, NO branch), method 250 proceeds to block 266. If the block 262 inquiry determines that there is free space in the decoded audio buffer (block 262, YES branch), method 250 proceeds to block 264.

Block 264 comprises decoding one segment of queued audio data (for example, from audio data queue 162) and storing the decoded audio segment in the decoded audio buffer (for example, decoded audio buffer 176). Block 264 may comprise decoding audio data corresponding to (or comprising) the next undecoded segment in an audio track, for example. In some embodiments, audio data decoded in block 264 is provided in a format that can be natively rendered by an internet browser operating on a user-computing device implementing a native audio renderer 182. By way of non-limiting illustration, in a particular example embodiment, block 264 comprises decoding audio data into .WAV file format or the like which is natively renderable by an internet browser operating on a user-computing device. Block 264 may comprise performing the steps of any suitable decoding algorithm, including (without limitation) those functionalities described above in connection with block 214. As discussed above, audio rendering system 150 (FIG. 2B) may comprise audio processing functionalities analogous to those of frame image processor 136 (FIG. 2A) which may be used to put decoded audio data into a format suitable for rendering. In such embodiments, block 264 may optionally be broken down to provide such functionalities in a manner analogous to optional blocks 214A, 214B, 214C, 214D of block 214 (FIG. 3). References to decoding audio data in method 250, decoding block 264 and decoder 172 (FIG. 2B) should be understood to optionally include any one or more of these functionalities associated with preparing audio data into a format suitable for rendering. Block 264 may optionally include audio-related processing of decoded audio data, such as filtering, volume adjustment, compression, etc.

After block 264, method 250 proceeds to block 266 which involves scheduling a subsequent iteration of method 250 for a time in the future. Block 266 may be similar to block 216 described above. Successive iterations of method 250 are scheduled at intervals less than the playback duration of the audio segments used in methods 250, 270. For example, if the audio segments used in methods 250, 270 have a playback duration of $\tau$, then block 266 may involve scheduling successive iterations of method 250 at intervals less than $0.5\tau$. In some embodiments, the scheduled method 250 intervals are less than $0.2\tau$. In some embodiments, the scheduled method 250 intervals are less than $0.1\tau$. After the next iteration of queuing and decoding method 250 is scheduled in block 266, method 250 ends and control is passed back to the script interpreter.

As discussed above, method 250 may be implemented natively by an internet browser operating on a user-computing device, when the browser interprets a cross-platform script (or part of a script). Particular functionalities of method 250 may be implemented directly by the script when the script is interpreted. For example, in particular embodiments, the functionalities of any of blocks 254, 256, 262, 264 may be performed directly by the script when it is interpreted.

FIG. 6 is a flowchart of a method 270 for method for implementing the audio renderer interface according to a particular embodiment. Method 270 may be implemented natively by an internet browser operating on a user-computing device, when the browser interprets a cross-platform script (or part of a script). For example, method 270 may be implemented as a set of scripted instructions (for example, a set of Javascript instructions). Particular functionalities of method 270 may be implemented directly by the script when the script is interpreted. Method 270 starts in block 272 which involves and inquiry into whether the last segment of audio data has been loaded from the decoded audio buffer (for example, decoded audio buffer 176 (FIG. 2B)) to the audio renderer (for example, audio renderer 182 (FIG. 2B)). If the block 272 inquiry is positive (i.e. all decoded audio data has been provided to the audio renderer (block 272, YES branch)), method 270 proceeds to block 276 via optional block 274 described below. If on the other hand, the block 272 inquiry determines that there is still decoded audio data in the decoded audio buffer to be provided to audio renderer (block 272, NO branch), then method 270 proceeds to block 280.

Block 280 involves an inquiry into whether the audio renderer can accept more audio data (for example, whether there is space in the internal buffer of the audio renderer to accept another segment of audio data). If the block 280 inquiry determines that the audio renderer can not accept more audio data (block 280, NO branch), method 270 proceeds to block 276 via optional block 274 described below. Otherwise, if the audio renderer can accept more audio data (block 280, YES branch), method 270 proceeds to block 282. Block 282 involves an inquiry into whether there is decoded audio data available in the decoded audio buffer to be loaded into the audio renderer. If the block 282 inquiry determines that sufficient decoded audio data is available in the decoded audio buffer (block 282, YES branch), then method 270 proceeds to block 284 which involves transferring a segment of decoded audio data from the decoded audio buffer into the audio renderer. This block 284 data transfer may involve formatting the audio data in a format suitable for use by the audio renderer. After loading audio data into the audio renderer in block 284, method 270 proceeds to block 276 via optional block 274.

Returning to block 282, if the block 282 inquiry determines that sufficient decoded audio data is not available in the decoded audio buffer (block 282, NO branch), then method 270 proceeds to block 276 via optional blocks 286 and 274. Optional block 286 may involve one or more drop audio actions, such as: recording the fact that the audio renderer had capacity to accept more decoded audio data, but that such decoded audio data was not available in the decoded audio buffer; pausing or slowing down playback of the audio data by the audio renderer (for example, to permit the decoding and/or queuing of audio data to catch up to the audio renderer), indicating (for example, to another process, method, or the like) that audio data should be decoded and/or queued more quickly (such as by obtaining audio data at a faster rate, decoding audio data more often, switching to a lower bitrate audio source, etc.), and/or the like, for example.

Method 270 may end up at optional block 274 via a variety of paths. Optional block 274 involves procuring a current time value from the audio renderer. This current time value may comprise a time reference associated with the playback of the current segment of audio data. By way of non-limiting illustration, in a particular example embodiment method 270 is implemented as a set scripted instructions (for example, a set of Javascript instructions), and optional block 274 may involve invoking the audio.buffered.end method on an associated audio object to obtain a value indicating the time of the last rendered (or about to be rendered) segment of the associated audio data. The time value obtained in optional block 274 may be made available to block 224A of method 220 (FIG. 4). In some embodiments, block 274 is not required, because the time value is obtained in block 224A of method 220.

Method 270 eventually proceeds to block 276 which involves an inquiry into whether the playback of audio data by the audio renderer is complete. If the block 276 inquiry is positive (i.e. audio playback is complete), then method 270 ends. If, on the other hand, the audio playback is incomplete (block 276, NO branch), method 270 proceeds to block 278 which involves scheduling a subsequent iteration of method 270 for a time in the future. Block 278 may be similar to block 230 (FIG. 4) described above. Successive iterations of method 270 are scheduled at intervals less than the playback duration of the audio segments used in methods 250, 270. For example, if the audio segments used in methods 250, 270 have a playback duration of $\tau$, then block 278 may involve scheduling successive iterations of method 270 at intervals less than $0.5\tau$. In some embodiments, the scheduled method 270 intervals are less than $0.2\tau$. In some embodiments, the scheduled method 270 intervals are less than $0.1\tau$. After the next iteration of method 270 is scheduled in block 278, method 270 ends and control is passed back to the script interpreter.

As discussed above, method 270 may be implemented natively by an internet browser operating on a user-computing device, when the browser interprets a cross-platform script (or part of a script). Particular functionalities of method 270 may be implemented directly by the script when the script is interpreted. For example, in particular embodiments, the functionalities of any of blocks 272, 280, 282, 286, 276 may be performed directly by the script when it is interpreted.

In the illustrated embodiments, method 250 procures and decodes (and otherwise prepares) no more than one segment of audio data each time that it is performed, and method 270 loads no more than one segment of audio data into the audio renderer each time it is performed. As discussed above, the length of such segments may be a configurable parameter which may depend, for example, on available processing resources at the user-computing device. In some embodiments, each audio segment comprises a frame of audio data. This implementation may be advantageous where methods 250 and 270 are implemented as iteratively and asynchronously interpreted by the same script interpreter of an application program executing in a single thread of execution (for example, the Javascript interpreters of some major internet browsers). For example, such an implementation may permit method 270 to load audio data (decoded by method 250) into the audio renderer between successive iterations of method 250. In other embodiments, multiple segments of audio data may be procured and/or decoded (or otherwise prepared) in each iteration of method 250 and/or multiple segments may be rendered in each iteration of method 270. Also, as discussed above, in some embodiments, one segment of audio data may be partially prepared (for example, a subset of blocks analogous to blocks 214A, 214B, 214C, 214D) in each iteration of method 250.

The scheduling of methods 250, 270 may have characteristics similar to those of the scheduling of methods 200, 220 discussed above. Schedule intervals may be constant, dynamic, coordinated, short enough to permit audio data to be queued, decoded and rendered at the sampling rate of the audio data or at a rate suitable for human listeners. Methods 250, 270 may be configured to have the same or different inter-repetition periods. In some embodiments, method 250 is configured to be performed more frequently than method 270. In some embodiments, one or both of methods 250, 270 may be multiply instantiated, such that there a plurality of one or both methods continually scheduling successive iterations of themselves (for example, at the same inter-repetition periods or at different inter-repetition periods).

As discussed above, in some embodiments, internet browsers can natively render encoded audio data. In such embodiments, suitable modifications can be made to methods 250, 270 such that the steps associated with decoding audio data and queuing decoded audio data are not required.

Figure 7:
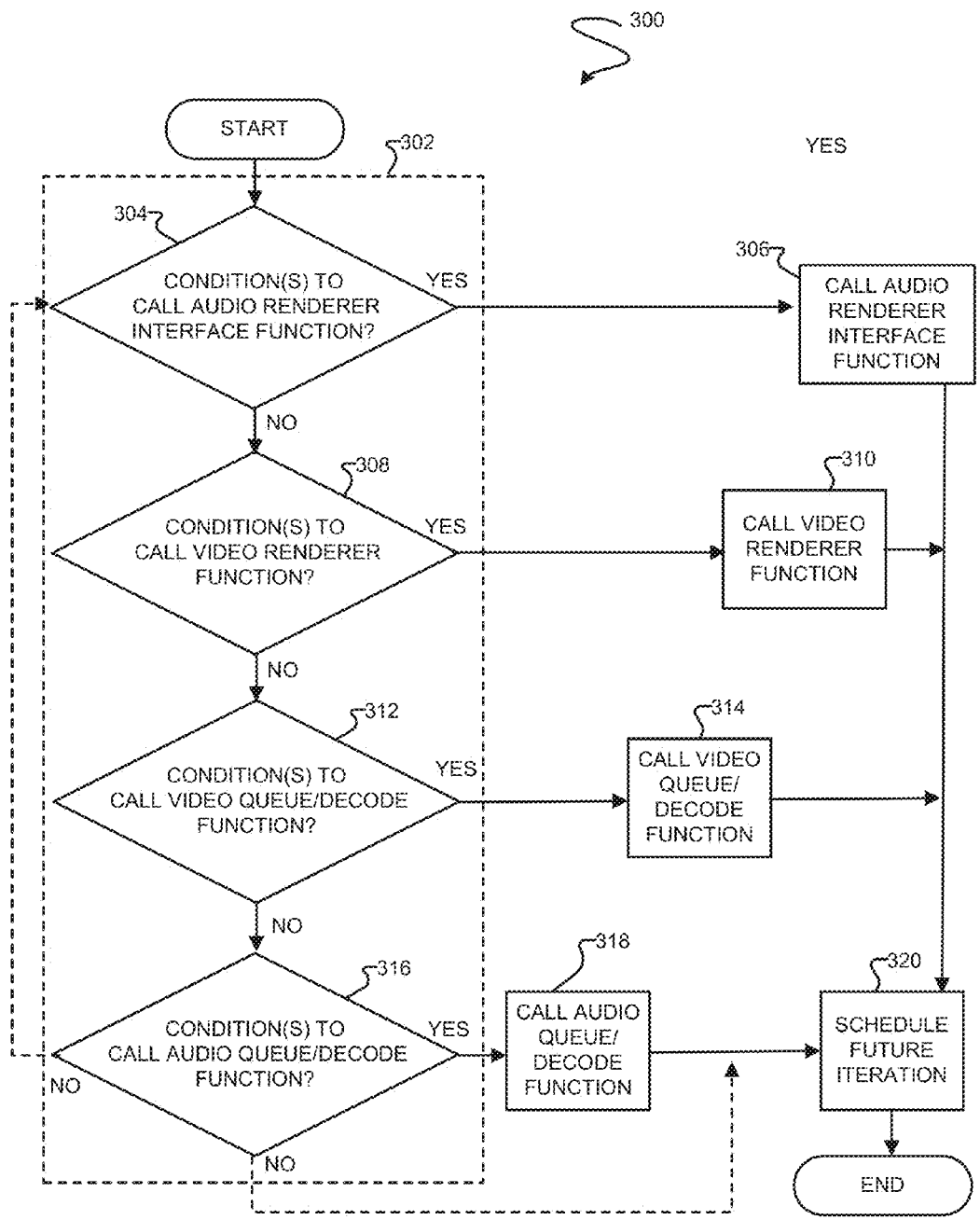
FIG. 7 is a flow chart of a method for queuing and decoding audio and video data, rendering video data and implementing an audio renderer interface according to another example embodiment.

In the embodiment described above in connection with FIGS. 3-6, multi-threaded processing is simulated by scheduling successive iterations of methods 200, 220, 250, 270 which are performed in turn by a single-threaded interpreter. FIG. 7 is a flow chart of a method 300 which may be used to queue, decode and prepare audio and video data, to render video data and to implement an audio renderer interface according to another embodiment. Using method 300 involves iteratively scheduling and interpreting successive iterations of the single method 300 code segment, but incorporating logic into the method 300 code segment to determine which procedure is performed in each iteration.

Method 300 comprises a logic block 302, which, in the illustrated embodiment, involves a number of logical inquiries 304, 308, 312, 316. In some embodiments, logic block 302 or particular functionalities of logic block 302 may be implemented directly by the script when the script is interpreted. Logic block 302 may dictate which procedure is performed in method 300. For example, in the illustrated embodiment logic block 302 starts in block 304 which involves an inquiry into whether conditions are suitable for performing an audio renderer interface procedure. The block 304 conditions may generally comprise conditions based on any information which may be natively or directly available to the script. For example, the block 304 conditions may be based on comparing the amount of audio data in the buffer of the audio renderer to some threshold. If it is determined that the amount of audio data in the audio renderer buffer is less than some threshold amount, then it may be desirable to perform the audio renderer interface procedure to load more audio data into the audio renderer. The block 304 conditions are not limited to conditions that are directly related to the audio renderer interface or to audio rendering generally. In some embodiments, the block 304 conditions may involve evaluating whether some other functionality may be in more immediate need. For example, the block 304 conditions may involve an evaluation of whether it is more important (in the current iteration of method 300) to perform the video decoding procedure, even if the amount of audio data in the audio renderer buffer is less than the threshold amount. The block 304 conditions may be based on information generated in drop audio block 286 (FIG. 6) and/or drop frame block 234 (FIG. 4).

If evaluation of the block 304 conditions determines that conditions are suitable for performing an audio renderer interface procedure (block 304, YES branch), then method 300 proceeds to block 306. Block 306 involves performing an audio renderer interface procedure. Such an audio renderer interface procedure may involve a method similar to that of method 270 (FIG. 6), except that the block 278 scheduling of a future iteration is not required. After returning from the audio renderer interface procedure, method 300 proceeds to block 320 which involves scheduling another iteration of method 300 for a time in the future. The block 320 scheduling may be similar to that described above for the scheduling blocks of methods 200, 220, 250, 270. For example, where method 300 is implemented as a set of scripted instructions (for example, a set of Javascript instructions), block 320 may comprise using the setTimeout( ) and/or setInterval( ) methods. The block 320 scheduled intervals may be static or dynamic. The block 320 scheduled intervals may be shorter than the maximum time that may elapse yet still permit video and audio data to be queued, decoded and/or otherwise prepared and rendered at suitable rates. In some embodiments, the block 320 scheduled intervals are in a range of 0.25 ms-25 ms. In some embodiments, the block 320 scheduled intervals are scheduled for as soon as possible after completion of the current iteration of method 300.

If evaluation of the block 304 conditions determines that conditions are not suitable for performing an audio renderer interface procedure (block 304, NO branch), then method 300 proceeds to block 308. Block 308 involves an inquiry into whether conditions are suitable for performing a video renderer procedure. The block 308 inquiry may be similar to the block 304 inquiry and may be based on any information which may be natively or directly available to the script. By way of non-limiting example, the block 308 inquiry may be based on evaluating a current frame index (obtained, for example, in a manner similar to that described above in block 224 (FIG. 4)) and determining if the current frame index is greater than the frame index of the last video frame rendered. If the current frame index is greater than the last video frame rendered then it may be desirable to perform the video renderer procedure to render another frame of video data. As with the block 308 conditions described above, the block 308 conditions may involve evaluating whether some other functionality may be in more immediate need. The block 304 conditions may be based on information generated in drop audio block 286 (FIG. 6) and/or drop frame block 234 (FIG. 4). If evaluation of the block 308 conditions determines that conditions are suitable for performing a video rendering procedure (block 308, YES branch), then method 300 proceeds to block 310. Block 310 involves performing a video rendering procedure. Such a video rendering procedure may involve a method similar to that of method 220 (FIG. 4), except that the block 230 scheduling of a future iteration is not required. After returning from the video renderer procedure, method 300 proceeds to schedule another iteration in block 320.

If evaluation of the block 308 conditions determines that conditions are not suitable for performing a video renderer procedure (block 308, NO branch), then method 300 proceeds to block 312. Block 312 involves an inquiry into whether conditions are suitable for performing a video queuing/decoding procedure. The block 312 inquiry may be similar to the inquiries of blocks 304, 308 and may be based on any information which may be natively or directly available to the script. By way of non-limiting example, the block 312 inquiry may be based on comparing the amount of prepared video data in the frame image buffer (for example, frame image buffer 126 (FIG. 2A)) to a suitable threshold and/or comparing the amount of video data in the video data queue (for example, video data queue 112 (FIG. 2A)) to a suitable threshold. As with the conditions of blocks 304, 308, the block 312 conditions may involve evaluating whether some other functionality may be in more immediate need. The block 312 conditions may be based on information generated in drop audio block 286 (FIG. 6) and/or drop frame block 234 (FIG. 4). If evaluation of the block 312 conditions determines that conditions are suitable for performing a video queuing/decoding procedure (block 312, YES branch), then method 300 proceeds to block 314. Block 314 involves performing a video queuing/decoding procedure. Such a video queuing/decoding procedure may involve a method similar to that of method 200 (FIG. 3), except that the block 216 scheduling of a future iteration is not required. After returning from the video queuing/decoding procedure, method 300 proceeds to schedule another iteration in block 320.

If evaluation of the block 312 conditions determines that conditions are not suitable for performing a video queuing/decoding procedure (block 312, NO branch), then method 300 proceeds to block 316. Block 316 involves an inquiry into whether conditions are suitable for performing an audio queuing/decoding procedure. The block 316 inquiry may be similar to the inquiries of blocks 304, 308, 312 and may be based on any information which may be natively or directly available to the script. By way of non-limiting example, the block 316 inquiry may be based on comparing the amount of decoded audio data in the decoded audio buffer (for example, decoded audio buffer 176 (FIG. 2B)) to a suitable threshold and/or comparing the amount of audio data in the audio data queue (for example, audio data queue 162 (FIG. 2B)) to a suitable threshold. As with the conditions of blocks 304, 308, 312, the block 316 conditions may involve evaluating whether some other functionality may be in more immediate need. The block 316 conditions may be based on information generated in drop audio block 286 (FIG. 6) and/or drop frame block 234 (FIG. 4). If evaluation of the block 316 conditions determines that conditions are suitable for performing an audio queuing/decoding procedure (block 316, YES branch), then method 300 proceeds to block 318. Block 318 involves performing an audio queuing/decoding procedure. Such an audio queuing/decoding procedure may involve a method similar to that of method 250 (FIG. 5), except that the block 266 scheduling of a future iteration is not required. After returning from the audio queuing/decoding procedure, method 300 proceeds to schedule another iteration in block 320.

In the illustrated embodiment, if evaluation of the block 316 conditions determines that conditions are not suitable for performing a video queuing/decoding procedure (block 316, NO branch), then method 300 proceeds along one of two optional paths. In some cases, the block 316 NO branch may cause method 300 may loop back to block 304. In other cases, the block 316 NO branch may cause method 300 to proceed to schedule another iteration in block 320. In other embodiments, the block 316 NO branch may lead method 300 to another functional block (not shown) which may involve selecting one of the procedures (for example, blocks 306, 310, 314, 318). Such a selection may be based on which of the conditions of blocks 304, 308, 312, 316 is closest to the positive result. In still other embodiments, block 316 is not required and the block 312 NO branch may lead directly to block 318. In such embodiments, the block 318 audio queuing/decoding procedure is the default procedure. In other embodiments, the logic of logic block 302 could be constructed such that one of the other procedures (for example, one of blocks 306, 310, 314) is the default procedure.

In some circumstances, a particular functional block of methods 200, 220, 250, 270, 300 may take an unduly long period of time which may cause rendering artefacts. For example, a processor intensive functional block of method 200 (FIG. 3) is block 214 which involves preparing a frame of video data. Block 214 may be particularly processor intensive if all of the functionalities of blocks 214A, 214B, 214C, 214D are lumped into block 214. In some circumstances, particularly on devices with relatively little processing capacity, the time required for preparing a frame of video data in block 214 may be longer than the inter-frame interval (i.e. (frame rate)$^{-1}$) of the associated video data. In such circumstances, video frames could be skipped or lost because the processor is working on decoding a frame of video data in block 214 when it might otherwise have been rendering a frame of video data, resulting in video artefacts.

In some embodiments, methods 200, 220, 250, 270, 300 may be parsed or sub-divided into sub-components (for example, functional sub-blocks or sub-steps) and functionalities related to video and/or audio rendering (for example, video rendering method 220 and/or audio rendering interface method 270) may be performed between such sub-components. Continuing with the example of video preparation block 214, video preparation block 214 may be sub-divided into a number of sub-components, which may comprise sub-components 214A, 214B, 214C, 214D or which may comprise other (illustrated or non-illustrated) sub-components. In some embodiments, sub-components 214, 214B, 214C, 214D may themselves be sub-divided into further sub-components. After particular sub-components of block 214, conditions may be evaluated to determine whether block 214 should be interrupted to perform a procedure related to video and/or audio rendering (for example, video rendering method 220 and/or audio rendering interface method 270). Such interrupt conditions may be similar to those conditions described above for blocks 304, 308, 312, 316 and may generally be based on any information which may be natively or directly available to the script. For example, the interrupt conditions associated with performing a video rendering procedure may be similar to those of block 308 and the interrupt conditions associated with performing an audio renderer interface procedure may be similar to those of block 304. If such interrupt conditions are evaluated to be positive, then video decoding block 214 may be interrupted and the appropriate video rendering procedure and/or audio renderer interface procedure may be performed. After performing this procedure, video decoding block 214 may be resumed. Performing such functionalities between the sub-components of video decoding block 214 may help to reduce rendering artefacts.

Sub-dividing methods 200, 220, 250, 270, 300 into sub-components and performing functionalities related to video and/or audio rendering between such sub-components is not limited to the example of block 214 described above. Methods 200, 220, 250, 270, 300 (and/or any suitable illustrated or non-illustrated blocks or steps of methods 200, 220, 250, 270, 300) may be sub-divided in any suitable manner into any suitable sub-components.

As discussed above, in particular non-limiting example embodiments, block 208 of method 200 (FIG. 3) and block 258 of method 250 (FIG. 5) may involve invoking the open( ) method of an AJAX XMLHttpRequest object corresponding to video content hosted on a server. This block 258 functionality requests that the internet browser retrieve some video and/or audio data in a format that can be interpreted by Javascript. In some embodiments, block(s) 208 and/or 258 (and their corresponding method(s) 200, 250) may make use of multiple AJAX XMLHttpRequest (hereinafter AJAX) objects which may be used iteratively to increase the efficiency of block(s) 208 and/or 258.

Figure 8:
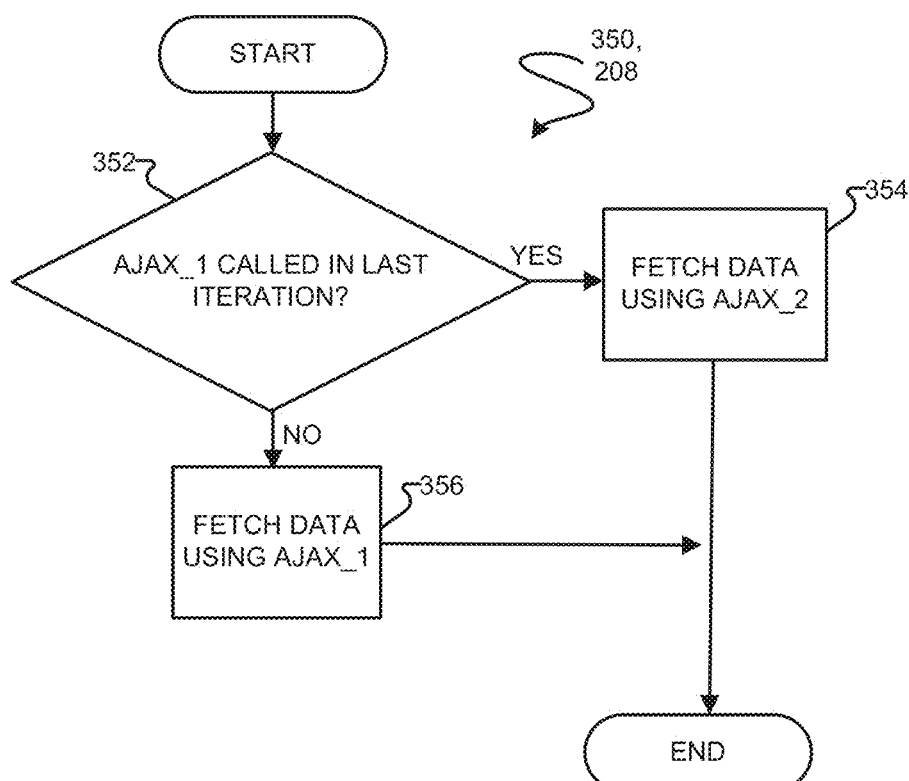
FIG. 8 is a flow chart of a method for fetching video data according to a particular example embodiment.

FIG. 8 shows a flow chart of a method 350 which may be used to implement the video data fetching functionality of block 208. Block 258 may be implemented in a similar manner. In the illustrated embodiment, method 350 involves the use of two AJAX objects. It will be appreciated, however, that method 350 may be extended to use more than two AJAX objects. Method 350 starts in block 352 which involves an inquiry into whether the first AJAX object (AJAX_1) was used in the last iteration of method 350. If the block 352 inquiry is positive (block 352, YES branch), then method 350 proceeds to block 354. In block 354, the second AJAX object (AJAX_2) is used to fetch the next set of data. Data retrieved by AJAX_2 is stored in a data structure managed natively by the internet browser (or other application program) which provides the AJAX_2 object. If the block 352 inquiry is negative (block 352, NO branch), then method 350 proceeds to block 356. In block 356, the AJAX_1 is used to fetch the next set of data. Data retrieved by AJAX_1 is stored in a data structure managed natively by the internet browser (or other application program) which provides the AJAX_1 object. Method 350 ends after implementing block 354 or block 356.

In some embodiments, the data retrieval functionality of block 208 (including method 350) may be performed by natively the internet browser under the direction of the script. In some embodiments, the data retrieval functionality of block 208 (including method 350) may be performed as a parallel thread (in a multi-threaded environment) or as a parallel process (in a multiprocessing environment) to that of the remainder of method 200. For example, in some embodiments, an internet browser can perform one parallel thread/ process (involving a script interpreter, for example) to implement method 200 and can perform a second parallel thread/ process (involving AJAX objects, for example) to implement method 350. Using multiple AJAX objects in method 350 may also take advantage of user-computing devices capable of implementing multiple-threaded and/or multiprocessing environments. For example, a thread or process may be assigned to each of the multiple AJAX objects.

When the script interpreter of an internet browser is interpreting a script, its memory management procedures may be relatively inefficient. This is particularly the case for so-called "garbage collection", which is used to free up previously allocated memory that is no longer in use. Garbage collection can be particularly inefficient, can consume processing resources and can occur at undesirable times—for example, at times when it is desired to render a frame image or a next segment of audio. Using method 350, the multiple AJAX objects can be used as a type of "round robin" buffer which can avoid the need for intermediate buffering of the encoded video data using memory allocated by the script interpreter of internet browser. Where only a single AJAX object is used, it may be necessary or desirable to copy fetched data strings from the AJAX object into an intermediate buffer managed by the script interpreter of the internet browser. Such intermediate buffering may be necessary or desirable to free up the single AJAX object, so that it can be used to fetch more data. Such intermediate buffering can be avoided by using multiple AJAX objects, because one of the AJAX objects can be used to fetch data, while the data from any other AJAX objects can be used to provide data as required by the script implementing the rest of method 200. In addition to using fetched data directly from the multiple AJAX objects, the functionality of the browser responsible for implementing the AJAX objects can manage the creation/destruction of data which can be more efficient than the creation/destruction of data by the browser's script interpreter.

Also, in some circumstances data accessed via the internet or via some other network may have a per-connection bandwidth limit. In such circumstances, the use of multiple AJAX objects may enable data to be streamed faster.

In embodiments implemented in scripts other than Javascript, similar methods and similar objects may be used to fetch video and/or audio data. In such embodiments, multiple data fetching objects may be used in a manner similar to the use of multiple AJAX objects described herein.

In some embodiments, video content may be encoded using techniques that can be helpful to efficiently render the video content using a suitable script.

Some internet browsers only accept data having particular data formats (referred to as content-transfer formats) when such data is transferred from or otherwise passed by a script interpreter. For example, some browsers only read so called base64 encoded data formats when such data is transferred or otherwise passed to the browser by a Javascript interpreter. As discussed above, content-transfer encoder 145 of video rendering system 100 (FIG. 2A) may optionally convert frame images to a base64 (or other content-transfer) encoded format in optional block 214C of method 200 (FIG. 3). This content-transfer encoding can be a computationally expensive process at the user-computing device. For example, in the particular case of base64 encoding, such content-transfer encoding involves inspecting each set of 3 bytes and converting each set of 3 bytes into 4 characters. Such computational expense can lead to rendering artefacts—for example, in circumstances where such content-transfer encoding might delay the rendering of video frames by a period longer than the inter-frame period dictated by the desired frame rate.

In accordance with some embodiments, frame images of video data (and/or segments (for example, frames) of audio data) may be pre-encoded in a base64 (or some other suitable content-transfer format)—for example, prior to being provided to (or retrieved by) the user-computing device). The description that follows refers to the pre-encoding of frame images of video data into base64 or some other suitable content-transfer format, without loss of generality that such pre-encoding could also apply to audio data. This pre-encoding of frame images into base64 (or other suitable content-transfer) format is particularly useful where the underlying frame images of video data are represented in a format that can be natively rendered by the internet browser (for example, when the underlying frame images of video data are represented in JPEG or GIF format). In such cases, the processes of frame image conversion and content-transfer encoding (blocks 214B, 214C of method 200 (FIG. 3)) may be skipped, since the frame images (once decoded in block 214A) are already in a format that is suitable for transfer to, and rendering by, the internet browser. In such cases, frame image converter 142 and content-transfer encoder 145 of video rendering system 100 (FIG. 2A) may be similarly omitted. In some embodiments, the underlying frame images of video content may be transcoded into a format that can be natively rendered by the internet browser (for example, JPEG or GIF format) and then the transcoded frame images can be pre-encoded into a suitable content-transfer format. While such pre-encoding of the frame images into base64 (or other content-transfer) format may increase the size of encoded video content file(s), any increase in file size may have relatively little impact on the speed at which encoded files may be streamed to user-computing device(s), because of the compressibility of base64 (or other content-transfer) encoded data. Many data compression techniques supported by HTTP 1.1 (for example, gzip, deflate and/or the like) can take advantage of the fact that base64 (or other content-transfer) encoded data uses a limited character set (for example, 64 characters and a number of control characters in the case of base64).

This technique of pre-encoding frame images of video data (and/or frames of audio data) may decrease the consumption of processor resources at the user-computing device. More particularly, if frame images are pre-encoded into base64 or other suitable content-transfer format, they can be passed directly to an internet browser at the user-computing device without being converted or otherwise encoded in base64 format by the script at the user-computing device.

In some embodiments, where the frame images underlying the video content are pre-encoded into base64 format or into some other suitable content-transfer format, the data strings corresponding to the image are padded, so that the data string corresponding to each frame image has the same length. For example, in base64 the data strings corresponding to frame images may be padded with a suitable character, such as the line feed character <LF>. Such padding does not increase transfer speed significantly, because padded strings are relatively compressible. However, this padding of frame images can cause the script interpreter of the internet browser to reuse memory without reallocation and corresponding "garbage collection".

More specifically, without padding, each frame image will have a different length. The browser's script interpreter will typically allocate some memory at the user-computing device for storage of frame images. By way of non-limiting example, such frame image storage may be used to implement any of the frame image queues (for example, queues 126, 143, 141, 138 (FIG. 2A)). When it comes time to re-use some of the allocated memory to handle a new frame, if the size of the new frame is different from the size of the previous frame that is going to be overwritten, the script interpreter may decide that it needs to destroy the previous allocation and re-allocate memory to accommodate the new frame. The destruction and re-allocation of previously allocated memory is commonly referred to as "garbage collection". Such destruction and re-allocation of previously allocated memory can consume processor resources and lead to artefacts. In contrast, if all of the frames are the same size, then the script may overwrite the previous frame with the new frame inside of the previously allocated memory—without destroying the previous memory allocation or otherwise causing a memory re-allocation. This can reduce the consumption of processor resources associated with memory re-allocation and reduce the occurrence of rendering artefacts.

Currently, all internet browsers of interest natively support at least two image encoding file formats: JPEG and GIF. In particular embodiments, video content can be encoded with the frame images of the video content having a plurality of different encoding file formats. Video content may be encoded wherein the individual frame images are encoded in two or more different image encoding file formats (for example, JPEG and GIF). More particularly, during the encoding process, the encoding file format for each frame image may be selected based on the visual characteristics or content of the frame image. For example, GIF may be desirable for encoding frame images wherein the visual characteristics include sharp edges and details—for example, images displaying textual information (credit screens, title screens, etc.), cartoon images and/or the like. JPEG may be better suited for frame images incorporating more natural visual content (for example, without such sharp edges).

In some embodiments, individual frame images within a particular video content element may be processed to determine whether they might be better encoded in a JPEG file format or a GIF file format. For example, the values (e.g. luminosity and/or chromaticity values) associated with the individual pixels of each frame may be compared to the values associated with their adjacent pixels to determine one or more gradient metrics. In one embodiment, the group of adjacent pixels for a particular non-edge pixel may comprise its 8 neighboring pixels, although other groups of adjacent pixels could be used in other embodiments. In one example embodiment, the gradient metrics may be based on the differences in pixel values. The gradient metrics for all of the pixels in a particular frame image may then be analyzed to determine whether the particular frame image should be encoded in a JPEG or GIF file format. For example, if there are a relatively large number of relatively high gradient metrics, then this may be indicative of an frame image with sharp edges which should be encoded in a GIF format and, on the other hand, if there are a relatively large number of relatively low gradient metrics, then this may be indicative of an frame image that should be encoded in a JPEG file format. In one particular embodiment, this analysis of gradient metrics may be effected by binning the gradient metrics (to form a notional histogram or the like) and then comparing the numbers of gradient metrics in each bin to one or more suitable thresholds.

In some circumstances, it may be ascertained that the internet browser(s) of a user-computing device of interest are capable of natively rendering additional image encoding file formats. In such circumstances, such additional image encoding file formats may be incorporated into the encoding process. That is, video content may be encoded wherein the individual frame images within a particular video content element are encoded in 3 or more different image encoding file formats.

Encoding video content with individual frame images having different encoding file formats can permit improved compression (relative to encoding the frame images in a single file format), which can in turn lead to video content being procured and/or decoded more efficiently at the user-computing device and correspondingly fewer rendering artefacts.

In particular embodiments, the quantization tables used to encode frame images into the JPEG format (for example, the luminosity and chromaticity quantization tables) may be manipulated on a frame by frame basis in accordance with the visual content of each frame image. In some embodiments, the pixel values of each frame image may compared to those of either or both of its temporally adjacent frame images (for example, on a pixel-by-pixel basis) to determine one or more difference metric(s) and the quantization table(s) used to encode the frame image may be determined on the basis of such difference metric(s). For example, if it is determined that the chromaticity of a particular frame image does not differ significantly from the chromaticity of its adjacent frames (i.e. the chromaticity difference metric is low), then this may be indicative of a relatively slow moving scene, allowing the use of a chromaticity quantization table corresponding to a relatively high level of compression for that particular frame image. In contrast, if the chromaticity difference metric for the particular pixel is relatively high, then this may be indicative of a relatively fast moving scene, suggesting the use of a chromaticity quantization table corresponding to a relatively low level of compression for the particular frame image. Similar adjustment is possible for the luminosity quantization table.

The manipulation of the JPEG quantization tables for encoding frame images at the encoding side can help to achieve high compression without overly sacrificing human-perceptible details. Greater compression of the frame images can result in the use of less computational resources to decode and render the frame images at the user-computing device, which can in turn result in fewer rendering artefacts.

Some user-computing platforms do not support fetching of portions of video content files—they are only able to download (or otherwise procure) complete video content files. By way of non-limiting example, some mobile phone devices which run the Android™ operating system currently have this limitation. In some embodiments, a single video content file may be parsed into a series of chunks and each chunk may be encoded as if it were a complete video content file. This will allow the user-computing device to separately download (or otherwise procure) each chunk and the script, being interpreted at the user-computing device, can then be configured to organize the chunks together in order at the user-computing device to render the complete video content file. A list may be employed at the user-computing device to organize the smaller video content files in order.

Typically, although without limitation, video data is encoded at a frame rate of 24 frames/second or 33 frames/second. In some circumstances, it is anticipated that there will be insufficient processing resources available at the user-computing device to enable a script as described herein to support rendering of video data at these or other desired frame rates. Accordingly, in some embodiments, the video data may be down-sampled and re-encoded at a lower frame rate and, when the down-sampled video data is decoded at the user-computing device, available frame images may be displayed normally and, at times between available frame images, interpolated frame image may be drawn using an alpha blending technique. Such interpolation techniques are not limited to circumstances where the video data is down-sampled prior to encoding. In some embodiments, it may be determined at the user-computing device that there are insufficient processing resources to render video data at a desired frame rate, in which case the video data may be effectively down-sampled at the user-computing by selecting to decode and display a subset of the available image frames and, at times between the selected frame images, interpolated frame image may be drawn using an alpha blending technique. Examples of such processes are shown schematically in FIGS. 9A and 9B.

Figure 9A:
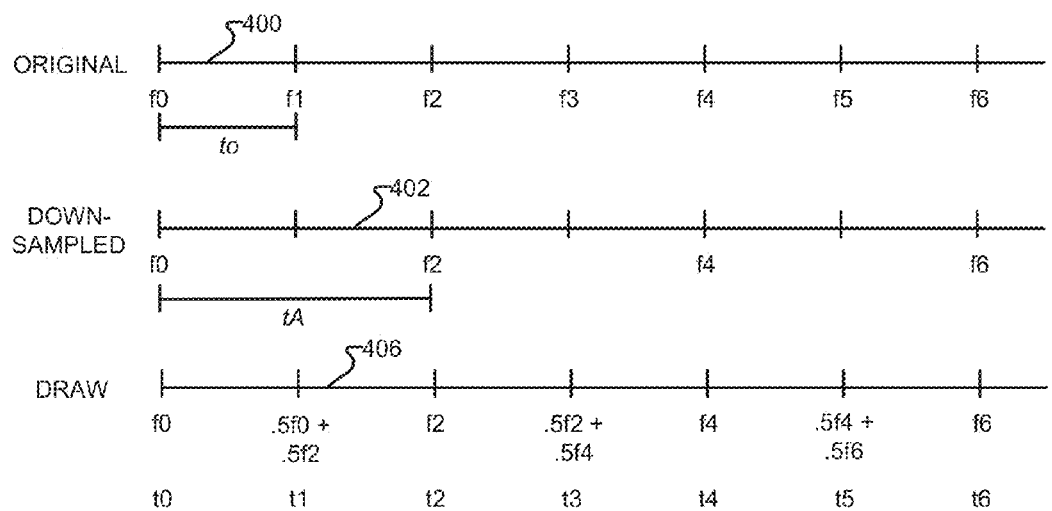
FIGS. 9A and 9B are schematic depictions of techniques for down-sampling frame interpolation according to particular example embodiments.
Figure 9B:
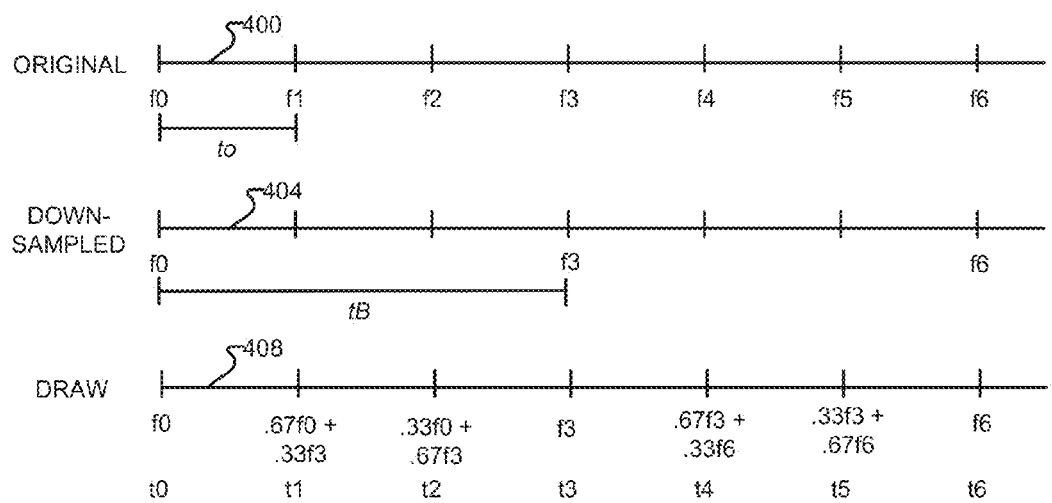

FIGS. 9A and 9B show an example where original video data 400 is has a frame rate $1/t_o$, where $t_o$ represents the frame interval and $f_0, f_1, f_2, f_3 \ldots$ represent the original frame images (for example, the pixel values of the individual pixels in the frame images). In each of FIGS. 9A and 9B, original video data 400 is down-sampled with a lower frame rate than original video data 400. As mentioned above, such down-sampling can be done prior to making the video data available to the user computing device; or such down-sampling can occur at the user-computing device by selecting a particular subset of the frame images from within the video data to decode and process. In the FIG. 9A example, original video data 400 is down-sampled by taking every second frame ($f_0$, $f_2$, $f_4$, $f_6 \ldots$) such that the re-encoded video data 402 has a frame rate $1/t_A$ which is half of the frame rate $1/t_o$ of original video data 400. In the FIG. 9B example, original video data 400 is down-sampled by taking every third frame ($f_0, f_3, f_6, f_9 \ldots$) such that the re-encoded video data 404 has a frame rate $1/t_B$ which is ⅓ of the frame rate $1/t_o$ of original video data 400. It will be appreciated by those skilled in the art that the examples of FIGS. 9A and 9B are merely explanatory and the original video data 400 may generally be down-sampled by taking any suitable fraction of the original frame images $f_0, f_1, f_2, f_3 \ldots$.

An advantage of the down-sampled video data 402, 404 in the embodiments of FIGS. 9A and 9B is that the user-computing device need only decode and prepare correspondingly fewer frames of image data. For example, in the case of FIG. 9A down-sampled video data 402, video decoder 122 and frame image processor 136 (see FIG. 2A) may only need to process half as many frame images in blocks 214A, 214B, 214C, 214D (see FIG. 3). Such a reduced amount of frame image decoding and/or preparation may reduce the burden on the user-computing device processing resources. In some embodiments, however, it may be desirable to render frame images (for example, by frame image renderer 132 (FIG. 2A) in block 236 (FIG. 4)) at the original frame rate $1/t_o$, as this will give the appearance of fluidly moving video. In such embodiments, it can be desirable to render interpolated frame images at times between the image frames of down-sampled video data 402, 404. For example, in the case of down-sampled video data 402 of FIG. 9A, it can be desirable to render interpolated frame images at times $t_1, t_3, t_5 \ldots$ even though down-sampled video data 402 does not include decoded frame images corresponding to these times. Similarly, in the case of down-sampled video data 404 of FIG. 9B, it can be desirable to render interpolated frame images at times $t_1, t_2, t_4, t_5 \ldots$ even though down-sampled video data 404 does not include decoded frame images corresponding to these times.

Figure 9C:
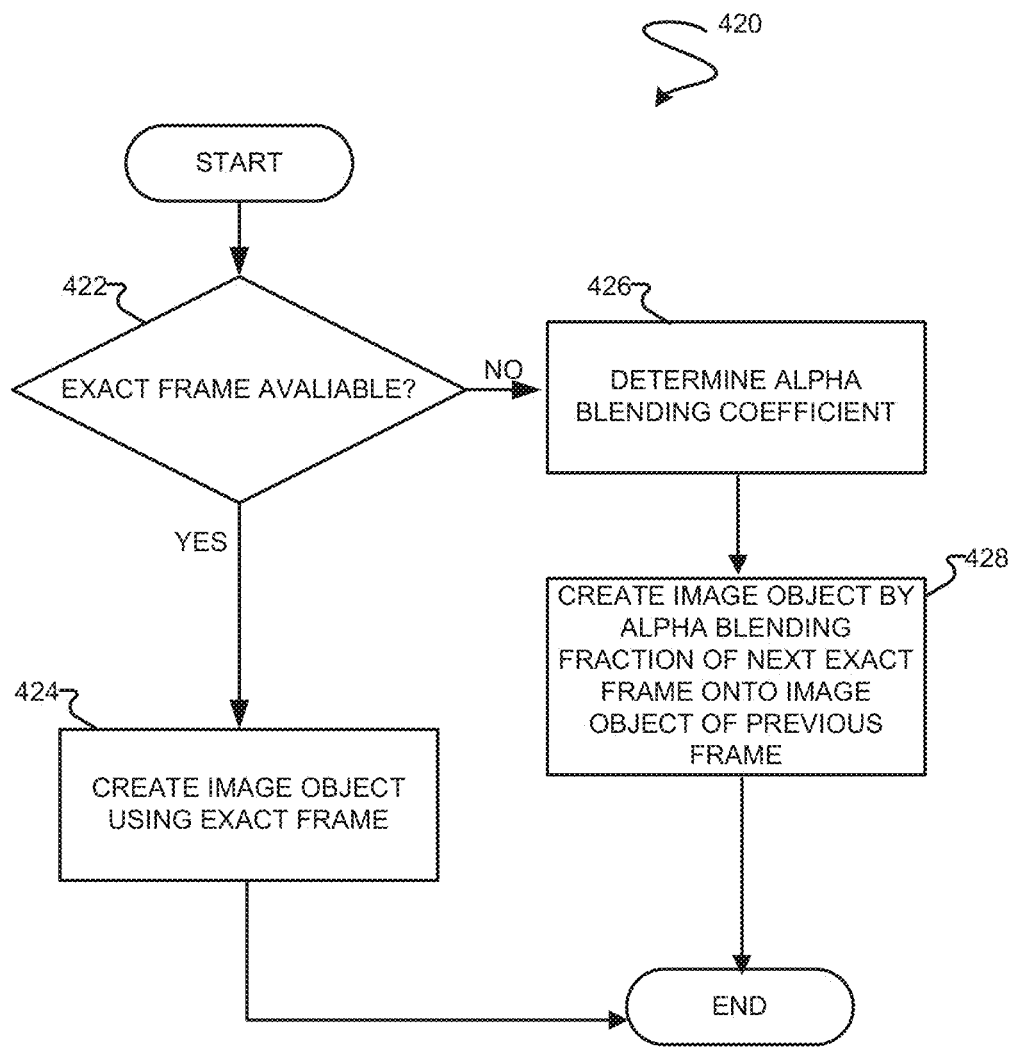
FIG. 9C is a block diagram of a method for preparing an alpha-blended image according to a particular embodiment suitable for use for frame interpolation in accordance with FIGS. 9A and 9B.

In some embodiments, such interpolation can be provided by creating image objects using alpha blending. Such alpha blended image objects may be created in block 148 (FIG. 2A) and block 214D (FIG. 3), for example. In the case of one particular embodiment, the image object created can be the argument of a canvas tag, for example. FIG. 9C shows a method 420 for creating such alpha-blended image objects according to a particular embodiment. Method 420 commences in block 422 which involves an inquiry into whether an exact frame is available for the current frame index (for example, the frame index determined in block 224 (FIG. 4)). If there is an exact frame available (block 422, YES branch), then method 420 proceeds to block 424 which involves creating an image object based on the exact frame. In the case of the example embodiment of down-sampled data 402 (FIG. 9A), method 420 is able to create image objects using the exact frames for frames $f_0, f_2, f_4, f_6 \ldots$ at times $t_0, t_2, t_4, t_6 \ldots$ and in the case of the example embodiment of down-sampled data 404 (FIG. 9B), method 420 is able to create image objects using the exact frames for frames $f_0, f_3, f_6 \ldots$ at times $t_0, t_3, t_6 \ldots$. This is shown schematically in FIG. 9A as data to be drawn 406 and in FIG. 9B as data to be drawn 408. Method 420 ends after creating the image object in block 424.

Returning to block 422, if the block 422 inquiry determines that there is no exact frame available for the current frame index (block 422, NO branch), then method 420 proceeds to block 426 which involves determining an alpha-blending coefficient. In general, the block 426 alpha-blending coefficient α may be provided by:

$$\alpha = [\beta + 1 - \mathrm{mod}(f\#, \beta)]^{-1}$$

where:
α is the desired alpha-blending coefficient;
β is the effective down-sampling factor or, equivalently, the number of rendering times between available image frames +1 (for example, β=2 for FIG. 9A and β=3 for FIG. 9B);
f# is the current frame index; and
mod(x,y) is the modulo operator which returns the whole number remainder of x divided by y.

Using this formula for the example of FIG. 9A, α=0.5 for $f_1, f_3, f_5 \ldots$ and for the example of FIG. 9B, α=0.33 for $f_1, f_4, f_7 \ldots$ and α=0.5 for $f_2, f_5, f_8 \ldots$. In general, the above equation is suitable for determining the alpha-blending coefficient for any down-sampling factor β. After block 426, method 420 proceeds to block 428 which involves creating an image object by alpha-blending a fraction of the next available image frame onto the image object of the previous image frame. The fraction of the next available image frame is determined by the block 426 alpha-blending coefficient. So, for example, for frame $f_1$ in the example of FIG. 9A, where α=0.5, the next available image frame is $f_2$ and the image object for the previous frame is $f_0$, block 428 involves creating an image object by alpha blending $0.5f_2$ onto the previous image object ($f_0$), which creates $f_1=0.5f_2+0.5f_0$. Similarly, for frame $f_3$ in the example of FIG. 9A, where α=0.5, the next available frame is $f_4$ and the image object for the previous frame is $f_2$, block 428 involves creating an image object by alpha blending $0.5f_4$ onto the previous image object ($f_2$), which creates $f_3=0.5f_4+0.5f_2$. This is shown schematically in FIG. 9A as data to be drawn 406. For image For frame $f_1$ in the example of FIG. 9B, where α=0.33, the next available image frame is $f_3$ and the image object for the previous frame is $f_0$, block 428 involves creating an image object by alpha blending $0.33f_3$ onto the previous image object ($f_0$), which creates $f_1=0.33f_3+0.67f_0$. For the frame $f_2$ in the example of FIG. 9B, where $\alpha=0.5$, the next available image frame is $f_3$ and the image object for the previous frame is $f_1=0.33f_3+0.67f_0$, block 428 involves creating an image object by alpha blending $0.5f_3$ onto the previous image object ($f_1=0.33f_3+0.67f_0$), which creates $f_3=0.5f_3+0.5(0.33f_3+0.67f_0)=0.67f_3+0.33f_0$. For the frame $f_4$ in the example of FIG. 9B, where $\alpha=0.33$, the next available image frame is $f_6$ and the image object for the previous frame is $f_3$, block 428 involves creating an image object by alpha blending $0.33f_6$ onto the previous image object ($f_3$), which creates $f_4=0.33f_6+0.67f_3$. For the frame $f_5$ in the example of FIG. 9B, where $\alpha=0.5$, the next available image frame is $f_6$ and the image object for the previous frame is $f_4=0.33f_6+0.67f_3$, block 428 involves creating an image object by alpha blending $0.5f_6$ onto the previous image object ($f_4=0.33f_6+0.67f_3$), which creates $f_4=0.5f_6+0.5(0.33f_6+0.67f_3)=0.67f_6+0.33f_3$. This is shown schematically in FIG. 9B as data to be drawn 408.

Method 420 ends after creating each image object in block 428. The process of method 420 (FIG. 9C) can be implemented in each iteration of method 200 (FIG. 3), for example in block 214, to interpolate frame images where frame images are not available because of down-sampling at the encoder side or effective down-sampling at the user-computing device. This can enable the user-computing device to render frame images at a desirable frame rate while reducing the load on processor resources at the user-computing device and, possibly, leading to fewer video artefacts.

In particular embodiments, the script, when interpreted, causes the user-computing device to access video content from a server or the like using the HTTP protocol. Unlike streaming media which may take advantage of relatively sophisticated protocols to tailor the video content to a particular user-computing device, a particular media player application and/or a particular streaming network connection speed (bitrate), HTTP servers using the HTTP protocol to transfer data typically have relatively limited capability for interaction with the user-computing device. In some embodiments, the script, when interpreted, determines characteristics of the user computing device, the internet browser and/or the network connection between the server and the user-computing device and takes appropriate action to tailor the rendering of the video content.

Figure 10:
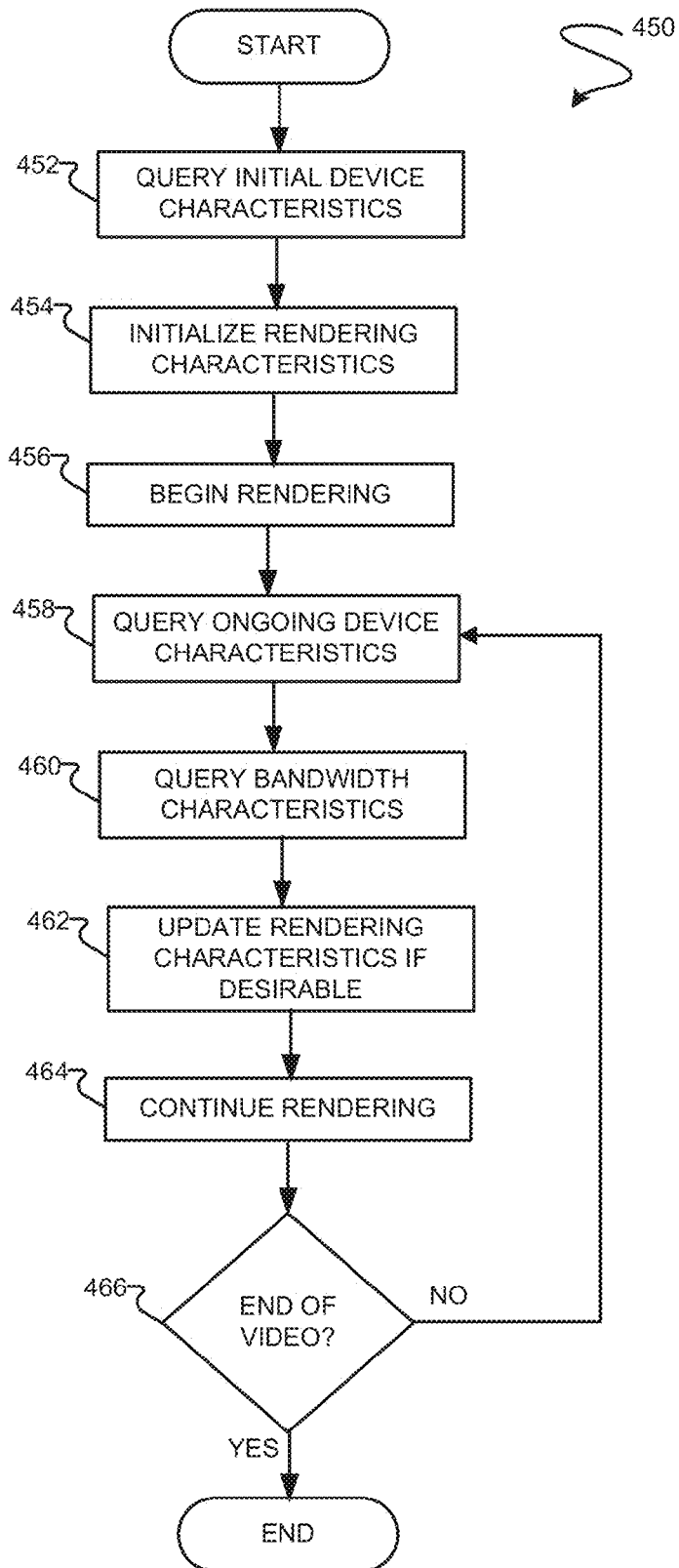
FIG. 10 is a block diagram of a method for rendering video content wherein the script, when interpreted, tailors the rendering of the video content based on one or more characteristics of the user-computing device and/or the network connection between the server and the user-computing device.

FIG. 10 shows a method 450 for rendering video content wherein the script, when interpreted, tailors the rendering of the video content based on one or more characteristics of the user-computing device and/or the network connection between the server and the user-computing device. Method 450, or portions thereof, may be implemented directly by the script. Method 450 starts in block 452 which involves querying initial device characteristics. Such device characteristics may include characteristics of the device hardware and/or software operating on the device (including the internet browser and/or the operating system software). Non-limiting examples of device characteristics include: processor speed and/or processing capacity; display characteristics (e.g. display resolution, display orientation, aspect ratio, screen size and/or the like); the presence of specialized hardware (e.g. specialized audio rendering hardware and/or video rendering hardware); software characteristics of the internet browser or other application program which interprets the script (such as capability of the internet browser to natively render particular audio formats and/or natively render particular image file formats); software characteristics of the device's operating system; file handling capabilities (such as whether the device, the device's operating system and/or the device's internet browser can accommodate the entirety of the video content as a single file or whether the video content must be parsed into a plurality of smaller files); and/or the like.

Once these device characteristics have been determined, the script, when interpreted, uses the device characteristics obtained in block 452 to initialize the rendering characteristics for the particular device in block 454. Initializing particular rendering characteristics in block 454 may involve selecting appropriate file(s) for downloading from a server. This may be the case, for example, where it is determined that a particular user-computing device needs to have the video content parsed into smaller files, where the native audio rendering capabilities of the user-computing device or its browser suggest the use of particular video content file(s), where the native image rendering capabilities of the user-computing device or its browser suggest the use of particular video content file(s), where the resolution and/or screen size of the display of the user device suggest the use of particular video content file(s), where knowledge of the user-computing device processor indicates that down-sampled video content file(s) should be used and/or the like. Initializing other rendering characteristics in block 454 may involve keeping track of particular information for subsequent rendering. This may be the case, for example, with rendering characteristics such as screen size, display orientation (aspect ratio) and/or the like.

Method 450 then proceeds to block 456 which involves beginning the rendering process according to any of the methods described previously. In block 456, the script, when interpreted, may attempt to procure appropriate video content file(s) based on the block 454 initialized rendering characteristics. Additionally or alternatively, in block 456 the script will cause the video content of any procured video content file(s) to be rendered based on the block 454 initialized rendering characteristics. By way of non-limiting example, in cases where the display of the user-computing has a certain resolution or screen size, the script will scale the image frames to best fit the display of the user computing device; in cases where the video data is down-sampled prior to being received at the user-computing device, the script will interpolate between known image frames; in cases where the video data is received at a particular frame rate, but the processor of the user-computing device can not decode and prepare image frames sufficiently fast, the script will effectively down-sample the video data at the user-computing device by selecting a subset of the image frames to decode and prepare and will interpolate between selected image frames; and/or the like.

From time to time, the script, when interpreted, will query the ongoing device characteristics in block 458. This block 458 query may be similar to the block 452 initial query, except that block 458 may inquire as to whether something has changed from the block 452 initial query. By way of non-limiting example, potential changes could involve a change in the orientation of the device display and the corresponding aspect ratio of image frames to be displayed. In some circumstances, block 548 may involve acquiring information from the drop video action in block 234 (FIG. 4) and/or the drop audio action in block 286 (FIG. 5). For example, if the block 458 query determines that over a threshold number of image frames have been dropped, then it may be concluded that the capacity of the user-computing device processor is insufficient to handle full frame rate video data and that the appropriate video content file(s) should possibly be changed to down-sampled file(s) or that the video data should be effectively down-sampled at the user computing device by selecting a suitable sub-set of the full rate video frames.

Also, from time to time, the script, when interpreted, will query the ongoing network characteristics between the server and the user-computing device in block 460. If the available bandwidth or bitrate between the server and the user-computing device is too low to ensure that the video content arrives at the user-computing device in time to be decoded and rendered, then it may be desirable to switch to lower quality video file(s), such as file(s) with down-sampled video data, file(s) with lower resolution and/or the like.

Block 462 involves updating the rendering characteristics based on the information obtained from block 458 and 460. For example, on the first iteration, block 462 may involve updating the block 454 initialized rendering characteristics based on the information obtained from block 458 and 460. In subsequent iterations, block 462 may involve updating the previous block 462 rendering characteristics. Method 450 then proceeds to block 464 which involves continuing to render the video content. Block 464 may be similar to block 456 described above, except that block 464 makes use of the rendering characteristics updated in block 462. As discussed above, the updated block 462 rendering characteristics (based on the queries of blocks 458 and 460) may lead to changes in the file(s) obtained for rendering (for example. higher or lower quality video files) or in the rendering of the video content generally (for example, scaling to accommodate display orientation). These changes may be implemented in block 464.

Method 450 then proceeds to block 466 which involves an inquiry as to whether the rendering of video content has finished. If so (block 466 YES branch), then method 450 ends. If there is more video content to be rendered (block 466 NO branch), then method 450 loops back to block 458 to repeat the process of querying device characteristics and updating the rendering characteristics from time to time.

Embodiments of the present invention include various operations, which are described herein. Unless otherwise specified, these operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (for example, software, processing application) readable by a machine (for example, a computer). The machine-readable medium may include, but is not limited to, magnetic storage medium (for example, floppy diskette); optical storage medium (for example, CD-ROM); magneto-optical storage medium; read-only memory (ROM); random-access memory (RAM); erasable programmable memory (for example, EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems. Methods indicated as a single series of process steps my have one or more subsets of the steps executed on a corresponding one or more computer processors that then communicate interim results or the availability of results among the computer processors using interprocess communication, for example. Data values may be stored in cache memory residing in proximity to the CPU or by addressing computer main memory through memory management hardware or even by such memory management hardware causing data to be stored on an external storage device to be loaded into computer main memory.

Computer processing components used in implementation of various embodiments of the invention include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In particular embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (for example, a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

While a number of exemplary aspects and embodiments have been discussed above, those of skill in the art will recognize certain modifications, permutations, additions and sub-combinations thereof. For example:

Method 300 may be multiply instantiated, such that there a plurality of methods continually scheduling successive iterations of themselves (for example, at the same inter-repetition periods or at different inter-repetition periods).

Some user-computing devices are known to have multiple and/or application-specific image/video rendering engines. Such image/video rendering engines may include suitable hardware and/or software. By way of non-limiting example, Apple's iPhone™ and iPad™ devices include an application-specific 3D image/video rendering engine. Some embodiments may involve triggering the internet browser of the user-computing device to activate such multiple and/or application-specific rendering engines. For example, some embodiments may involve triggering the Safari™ internet browser of an iPhone™ or iPad™ device to use the device's 3D rendering engine to help render the video content, even though the video content may not include 3D video data. In one specific, non-limiting embodiment, the following CSS code in a web page will trigger Safari™ to use the 3D rendering engine:

```
<style type="text/css">
body { margin: 0px; overflow: hidden; width : 100%;
```

```
// need the following 2 lines to trick safari to use the 3D accelerator
-webkit-transform: translateZ(-1000px);
-webkit-transform-style: preserve-3d;
}
.container { position : absolute; display : block;
// need the following 2 lines to trick safari to use the 3D accelerator
-webkit-transform-style: preserve-3d;
-webkit-transform : translateZ(0px);
overflow : hidden;
pointer-events :none;
}
</style>
```

In some embodiments, the internet browser is an application program that is compiled for specific user-computing device platforms. In other embodiments, the browser functionality is a part of the operating system or in some cases is functionality built into the device hardware.

It is therefore intended that the following appended claims and claims hereafter introduced are interpreted to include all such modifications, permutations, additions and sub-combinations as are within their true spirit and scope.

What is claimed is:

1. A method performed by a computer system for rendering video content on a user-computing platform that is one type of a plurality of different user-computing platform types, the method comprising:

transmitting a script to the user-computing platform, the script configured to be interpreted by an application program operating on any one of the plurality of user-computing platform types;

wherein transmitting the script causes the script to be interpreted by the application program operating on the user-computing platform to cause the interpreted script to directly decode encoded video data accessible to the user-computing platform into decoded video data comprising one or more frame images;

wherein transmitting the script causes the script to be interpreted by the application program to cause the interpreted script to directly decode encoded audio data accessible to the user-computing platform into decoded audio data;

wherein transmitting the script causes the script to be interpreted by the application program to: natively render the decoded video data by displaying the one or more frame images on the user-computing platform; and natively render the decoded audio data by playing back the decoded audio data;

wherein rendering the video data by displaying the one or more frame images comprises, at each of one or more times between displaying a first one of the frame images and displaying a second one of the frame images, displaying an alpha-blended image comprising an alpha-blend of the first one of the frame images and the second one of the frame images;

at each of the one or more times between displaying the first one of the frame images and displaying the second one of the frame images, displaying the alpha-blended image comprises alpha-blending the second one of the frame images onto a preceding displayed image using an alpha-blending coefficient α provided by:

$$\alpha=[\beta+1-\mathrm{mod}(f\#,\beta)]^{-1}$$

where:
β is a down-sampling factor equal to a number of the one or more times +1;

f# is an index referring to a number of a current one of the one or more times; and mod(x,y) is a modulo operator which returns the whole number remainder of x divided by y.

2. A method according to claim 1 wherein transmitting the script causes the script to be interpreted by the application program to natively display the one or more frame images on the user-computing platform.

3. A method according to claim 1 wherein transmitting the script causes the script to be interpreted by the application program to: render the decoded video data by displaying the one or more frame images on the user-computing platform; and render the decoded audio data by playing back the decoded audio data on the user computing platform.

4. A method according to claim 3 wherein transmitting the script causes the script to be interpreted by the application program to simulate a multi-threaded execution environment by iteratively scheduling and performing a method which, on each iteration makes one or more logical inquiries into one or more corresponding conditions and, in dependence on the one or more of the corresponding conditions, selects and performs one of:

a first simulated thread which comprises directly decoding the encoded video data into the frame images;

a second simulated thread which comprises rendering the video data by displaying the frame images;

a third simulated thread which comprises directly decoding the encoded audio data into the decoded audio data;

a fourth simulated thread which comprises implementing an audio renderer interface which provides the decoded audio data to an audio renderer.

5. A method according to claim 1 wherein the video data and audio data are associated with one another as parts of a video content item, the one or more frame images comprise a plurality of frame images and wherein transmitting the script causes the script to be interpreted by the application program to cause the interpreted script to directly synchronize the displaying of the frame images with the playback of the decoded audio data.

6. A method according to claim 1 wherein the video data and audio data are associated with one another as parts of a video content item, wherein the one or more frame images comprise a plurality of frame images and wherein transmitting the script causes the script to be interpreted by the application program to ascertain an audio playback time reference associated with the playback of the decoded audio data and causes the interpreted script to directly synchronize the displaying of the frame images with the playback of the decoded audio data based on the audio playback time reference.

7. A method according to claim 6 wherein synchronizing the displaying of the frame images with the playback of the decoded audio data comprises at least one of: advancing the display of frame images out of order by skipping the display of one or more frame images based on a determination that the rendering of the video data is behind the audio playback time reference by a first threshold amount of time; and causing one or more frame images to be displayed for time periods longer than those dictated by a frame rate of the video data based on a determination that the rendering of the video data is ahead of the audio playback time reference by a second threshold amount of time.

8. A method according to claim 6 wherein synchronizing the displaying of the frame images with the playback of the decoded audio data comprises: using the audio playback time reference to determine a current frame index; and if the frame image associated with the current frame index is ready to be displayed, displaying the frame image associated with the current frame index.

9. A method according to claim 8 wherein synchronizing the displaying of the frame images with the playback of the decoded audio data comprises determining that the frame image associated with the current frame index is behind one or more other frame images in a frame image queue and if so skipping the displaying of the one or more other frame images.

10. A method according to claim 8 wherein synchronizing the displaying of the frame images with the playback of the decoded audio data comprises determining that the frame image associated with the current frame index is not ready to be displayed and, in dependence on such determination, initiating a drop frame action, the drop frame action comprising one or more of: recording an indication that the frame image associated with the current frame index was not ready for rendering; causing the playback of decoded audio data to be paused or slowed; causing a rate of decoding of the encoded video data to be increased; causing a switch to video data having a lower frame rate; causing a switch to effective down-sampling of the video data by decoding a subset of the image frames.

11. A method according to claim 1 wherein transmitting the script causes the script to be interpreted by the application program to simulate a multi-threaded execution environment by: iteratively scheduling and performing a first simulated thread which comprises directly decoding the encoded video data into the frame images; and iteratively scheduling and performing a second simulated thread which comprises rendering the video data by displaying the frame images.

12. A method according to claim 11 wherein transmitting the script causes the script to be interpreted by the application program to simulate a multi-threaded execution environment by: iteratively scheduling and performing a third simulated thread which comprises directly decoding the encoded audio data into the decoded audio data; and iteratively scheduling and performing a fourth simulated thread which comprises implementing an audio renderer interface which supplies decoded audio data to an audio renderer.

13. A method according to claim 11 wherein performing the first simulated thread comprises: dividing the first simulated thread into a plurality of sub-components; between the performance of pairs of sub-components, making one or more logical inquiries into one or more corresponding conditions and, in dependence on the one or more corresponding conditions, temporarily interrupting the first simulated thread to select and perform an iteration of one of: the second simulated thread; and another simulated thread which involves implementing an audio renderer interface which provides decoded audio data to an audio renderer.

14. A method according to claim 1 wherein transmitting the script causes the script to be interpreted by the application program to cause the interpreted script to directly implement at least a portion of a video data queue monitor which directly monitors a video data queue to determine its status and, in dependence on the determined status of the video data queue, determines whether to fetch more encoded video data.

15. A method according to claim 14 wherein transmitting the script causes the script to be interpreted by the application program to implement a second portion of the video queue monitor which fetches more encoded video data using an AJAX XMLHttpRequest object.

16. A method according to claim 14 wherein transmitting the script causes the script to be interpreted by the application program to implement a second portion of the video queue monitor which fetches more encoded video data by alternatingly using a plurality of AJAX XMLHttpRequest objects.

17. A method according to claim 1 wherein transmitting the script causes the script to be interpreted by the application program to directly de-multiplex the video data from the audio data.

18. A method according to claim 1 wherein transmitting the script causes the script to be interpreted by the application program to cause the interpreted script to directly implement a frame buffer monitor which monitors a frame image buffer to determine its status and, in dependence on the determined status of the frame image buffer, determines whether to decode more of the encoded video data.

19. A method according to claim 1 wherein transmitting the script causes the script to be interpreted by the application program to cause the interpreted script to directly convert an image file format of at least one of the frame images from a first image file format into a second image file format, the second image file format capable of being natively rendered by the application program.

20. A method according to claim 1 comprising transmitting the encoded video data to the user-computing platform.

21. A method according to claim 20 comprising encoding the video content into the encoded video data prior to transmitting the encoded video data to the user-computing platform and wherein encoding the video content comprises: converting an image file format of at least one of the frame images from a first image file format into a second image file format, the second image file format capable of being natively rendered by the application program operating on the user-computer platform.

22. A method according to claim 20 comprising encoding the video content into the encoded video data prior to transmitting the encoded video data to the user-computing platform and wherein encoding the video content comprises:
    for at least a first one of the frame images provided in a first file format: analyzing content of the first one of frame images; selecting one among a plurality of secondary image file formats based on the analysis of the content of the first one of the frame images; and if the first file format differs from the selected one of the secondary image file formats, converting the image file format of the first one of the frame images into the selected one of the secondary file formats; and
    for at least a second one of frame images provided in a second file format: analyzing content of the second one of frame images; selecting a different one among the plurality of secondary image file formats based on the analysis of the content of the second one of the frame images; and if the second file format differs from the selected different one of the secondary image file formats, converting the image file format of the first one of the frame images into the selected different one of the secondary file formats;
wherein each of the plurality of secondary image file formats is capable of being natively rendered by the application program.

23. A method according to claim 20 comprising encoding the video content into the encoded video data prior to transmitting the encoded video data to the user-computing platform and wherein encoding the video content comprises: encoding at least one of the frame images in a content-transfer format whereby the content-transfer encoded frame images can be passed by a script interpreter interpreting the script to the application program.

24. A method according to claim 20 comprising encoding the video content into the encoded video data prior to transmitting the encoded video data to the user-computing platform and wherein encoding the video content comprises: for each of the plurality of frame images: encoding the frame image in a content-transfer format whereby the content-transfer encoded frame images can be passed by a script interpreter interpreting the script to the application program; and padding the content-transfer encoded frame image to a particular size with padding data unrelated to the frame image.

25. A method according to claim 20 comprising encoding video content into the encoded video data prior to transmitting the encoded video data to the user-computing platform and wherein encoding the encoded video data comprises: encoding at least one of the frame images in a base64 content-transfer format.

26. A method according to claim 1 wherein transmitting the script causes the script to be interpreted by the application program to cause the interpreted script to directly convert at least one of the frame images into a content-transfer format, the content-transfer format capable of being passed by a script interpreter interpreting the script to the application program.

27. A method according to claim 1 wherein transmitting the script causes the script to be interpreted by the application program to cause the interpreted script to directly convert at least one of the frame images into a base64 content-transfer format.

28. A method according to claim 1 wherein transmitting the script causes the script to be interpreted by the application program to natively convert at least one of the frame images into a corresponding image object capable of being natively rendered by the application program.

29. A method according to claim 1 wherein the application program comprises an internet browser.

30. A method according to claim 1 wherein the script is embedded in a HTML document.

31. A method according to claim 1 wherein the one or more frame images comprise a plurality of frame images and wherein transmitting the script causes the script to be interpreted by the application program to: render the audio data by playing back the decoded audio data; and render the video data by selecting a subset of the plurality of frame images and displaying the selected subset of the plurality of frame images.

32. A method according to claim 1 wherein transmitting the script causes the script to be interpreted by the application program to query one or more characteristics of the user-computing platform and to change a file comprising the encoded video data accessible to the user-computing platform in dependence on the one or more queried characteristics of the user-computing platform.

33. A method according to claim 1 wherein transmitting the script causes the script to be interpreted by the application program to query one or more characteristics of the user-computing platform and, in dependence on the one or more queried characteristics of the user-computing platform, to modify at least one characteristic of one or more of: the decoding of the encoded video data and the displaying of the one or more frame images.

34. A method according to claim 1 wherein transmitting the script causes the script to be interpreted by the application program to determine a data rate at which the encoded video data is transmitted to the user-computing platform and to change a file comprising the encoded video data transmitted to the user-computing platform in dependence on the determination.

35. A method according to claim 1 wherein transmitting the script causes the script to be interpreted by the application program to determine a data rate at which the encoded video data is transmitted to the user-computing platform and, in dependence on the determination, to modify at least one characteristic of one or more of: the decoding of the encoded video data and the displaying of the frame images.

36. A computer system comprising one or more computers operatively connected using a data communications network adapted to perform the method of claim 1.

37. A non-transitory computer-readable medium comprising computer executable code that, when executed by a computer system comprising one computer or a plurality of computers operatively connected using a data communications network, causes the computer system to perform the methods of claim 1.

38. A method executed on a user-computing platform for rendering video content, the method comprising:
  receiving a script at the user-computing platform, the script configured to be interpreted by an application program operating on the user-computing platform;
  interpreting the script using the application program on the computer platform;
  wherein interpreting the script causes the interpreted script to directly decode encoded video data accessible to the user-computing platform into decoded video data comprising one or more frame images;
  wherein interpreting the script causes the interpreted script to directly decode encoded audio data accessible to the user-computing platform into decoded audio data;
  wherein interpreting the script causes the interpreted script to: natively render the decoded video data by displaying the one or more frame images on the user-computing platform; and natively render the decoded audio data by playing back the decoded audio data;
  wherein rendering the video data by displaying one or more frame images comprises, at each of one or more times between displaying a first one of the frame images and displaying a second one of the frame images, displaying an alpha-blended image comprising an alpha-blend of the first one of the frame images and the second one of the frame images; and
  at each of the one or more times between displaying the first one of the frame images and displaying the second one of the frame images, displaying the alpha-blended image comprises alpha-blending the second one of the frame images onto a preceding displayed image using an alpha-blending coefficient α provided by:

$$\alpha = [\beta + 1 - \mathrm{mod}(f\#, \beta)]^{-1}$$

where:
  β is a down-sampling factor equal to a number of the one or more times +1;
  f# is an index referring to a number of a current one of the one or more times; and
  mod(x,y) is a modulo operator which returns the whole number remainder of x divided by y.

39. A system for rendering video content on a user-computing platform that is one type of a plurality of different user-computing platform types, the system comprising:
  a server computing device for transmitting a script to the user-computing platform, the script configured to be interpreted by an application program compiled to operate on any one of the plurality of user-computing platform types; and
  wherein transmitting the script causes the script to be interpreted by the application program operating on the user-computing platform to cause the interpreted script to directly decode encoded video data accessible to the user-computing platform into decoded video data comprising one or more frame images;

wherein the transmitted script causes the script to be interpreted by the application program to cause the interpreted script to directly decode encoded audio data accessible to the user-computing platform into decoded audio data;

wherein the transmitted script causes the script to be interpreted by the application program to: natively render the decoded video data by displaying the one or more frame images on the user-computing platform; and natively render the decoded audio data by playing back the decoded audio data;

wherein rendering the video data by displaying the one or more frame images comprises, at each of one or more times between displaying a first one of the frame images and displaying a second one of the frame images, displaying an alpha-blended image comprising an alpha-blend of the first one of the frame images and the second one of the frame images; and at each of the one or more times between displaying the first one of the frame images and displaying the second one of the frame images, displaying the alpha-blended image comprises alpha-blending the second one of the frame images onto a preceding displayed image using an alpha-blending coefficient α provided by:

$$\alpha=[\beta+1-\mathrm{mod}(f\#,\beta)]^{-1}$$

where:
  β is a down-sampling factor equal to a number of the one or more times +1;
  f# is an index referring to a number of a current one of the one or more times; and
  mod(x,y) is a modulo operator which returns the whole number remainder of x divided by y.

40. A system for rendering video content on a user-computer platform, the system comprising a processor configured to provide:

a decoding element for decoding encoded video data accessible to the user-computing platform into decoded video data comprising one or more frame images; and wherein the processor is configured to provide the decoding element by executing an application program on the user-computing platform, the application program interpreting a cross-platform script which causes the interpreted script to directly decode the video data;

the application program interpreting the script to cause the interpreted script to directly decode encoded audio data accessible to the user-computing platform into decoded audio data;

the application program interpreting the script to: natively render the decoded video data by displaying the one or more frame images on the user-computing platform; and natively render the decoded audio data by playing back the decoded audio data;

wherein rendering the video data by displaying the one or more frame images comprises, at each of one or more times between displaying a first one of the frame images and displaying a second one of the frame images, displaying an alpha-blended image comprising an alpha-blend of the first one of the frame images and the second one of the frame images; and at each of the one or more times between displaying the first one of the frame images and displaying the second one of the frame images, displaying the alpha-blended image comprises alpha-blending the second one of the frame images onto a preceding displayed image using an alpha-blending coefficient α provided by:

$$\alpha=[\beta+1-\mathrm{mod}(f\#,\beta)]^{-1}$$

where:
  β is a down-sampling factor equal to a number of the one or more times +1;
  f# is an index referring to a number of a current one of the one or more times; and
  mod(x,y) is a modulo operator which returns the whole number remainder of x divided by y.

* * * * *